United States Patent
Reid et al.

(10) Patent No.: US 9,841,787 B2
(45) Date of Patent: Dec. 12, 2017

(54) RETENTION FEATURES OF A PORTABLE COMPUTER

(71) Applicant: Apple Inc., Cupertino, CA (US)

(72) Inventors: Nicholas I. Reid, San Francisco, CA (US); Matthew W. Blum, San Francisco, CA (US); Fabio T. Campos, San Francisco, CA (US); Houtan R. Farahani, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 14/825,143

(22) Filed: Aug. 12, 2015

(65) Prior Publication Data

US 2016/0216735 A1     Jul. 28, 2016

Related U.S. Application Data

(60) Provisional application No. 62/106,687, filed on Jan. 22, 2015, provisional application No. 62/106,689, (Continued)

(51) Int. Cl.
*G06F 1/16* (2006.01)
*B29C 65/60* (2006.01)
*B29L 31/34* (2006.01)

(52) U.S. Cl.
CPC .......... *G06F 1/1662* (2013.01); *B29C 65/606* (2013.01); *G06F 1/1616* (2013.01);
(Continued)

(58) Field of Classification Search
CPC ...... G06F 1/161; G06F 1/1637; G06F 1/1656; G06F 1/181; G06F 1/1662; G06F 1/1681;
(Continued)

(56) References Cited

U.S. PATENT DOCUMENTS 5,196,993 A     3/1993  Herron et al.
8,242,374 B2    8/2012  Chuo et al.
(Continued)

FOREIGN PATENT DOCUMENTS

JP         2007208149 A  *  8/2007

*Primary Examiner* — Anthony Haughton
*Assistant Examiner* — Ingrid Wright
(74) *Attorney, Agent, or Firm* — David K. Cole; Kendall W. Abbasi

(57) ABSTRACT

A portable computing device is disclosed. The portable computing device includes a retention member that provides a force to a flexible circuit disposed in a top portion and a bottom portion of the portable computing device. The retention member limits movement of the flexible circuit when, for example, the flexible circuit receives a force in response to the top portion pivoting with respect to the bottom portion. The bottom portion of the portable computing devices includes a bottom case having multiple terraced regions. The terraced regions allow the bottom portion to receive additional internal components, such as one or more battery packs, a main logic board, and/or one or more speaker modules. The battery packs are secured to the terraced region via adhesive rings. Although the terraced regions require additional material removed from the bottom case, the internal components secured to the bottom case provide structural support.

20 Claims, 24 Drawing Sheets

Related U.S. Application Data filed on Jan. 22, 2015, provisional application No. 62/111,036, filed on Feb. 2, 2015, provisional application No. 62/111,042, filed on Feb. 2, 2015.

(52) U.S. Cl.
CPC .......... *G06F 1/1637* (2013.01); *G06F 1/1656* (2013.01); *B29L 2031/3481* (2013.01)

(58) Field of Classification Search
CPC ........ G06F 1/16; G06F 1/1613; G06F 1/1615; G06F 1/1633; G06F 1/1671; G06F 1/1684; G06F 1/1616; B29C 65/606; H05K 5/04; H05K 1/16
USPC ............ 361/679.01, 679.02, 679.21, 679.26, 361/679.27, 679.28, 749, 679.09, 679.08
See application file for complete search history.

(56) References Cited

U.S. PATENT DOCUMENTS

| | | |
|---|---|---|
| 8,753,150 B2 | 6/2014 | Scritzky et al. |
| 9,019,710 B2 | 4/2015 | Jeziorek |
| 9,411,380 B2 * | 8/2016 | Farahani ............... G06F 1/1656 |

* cited by examiner

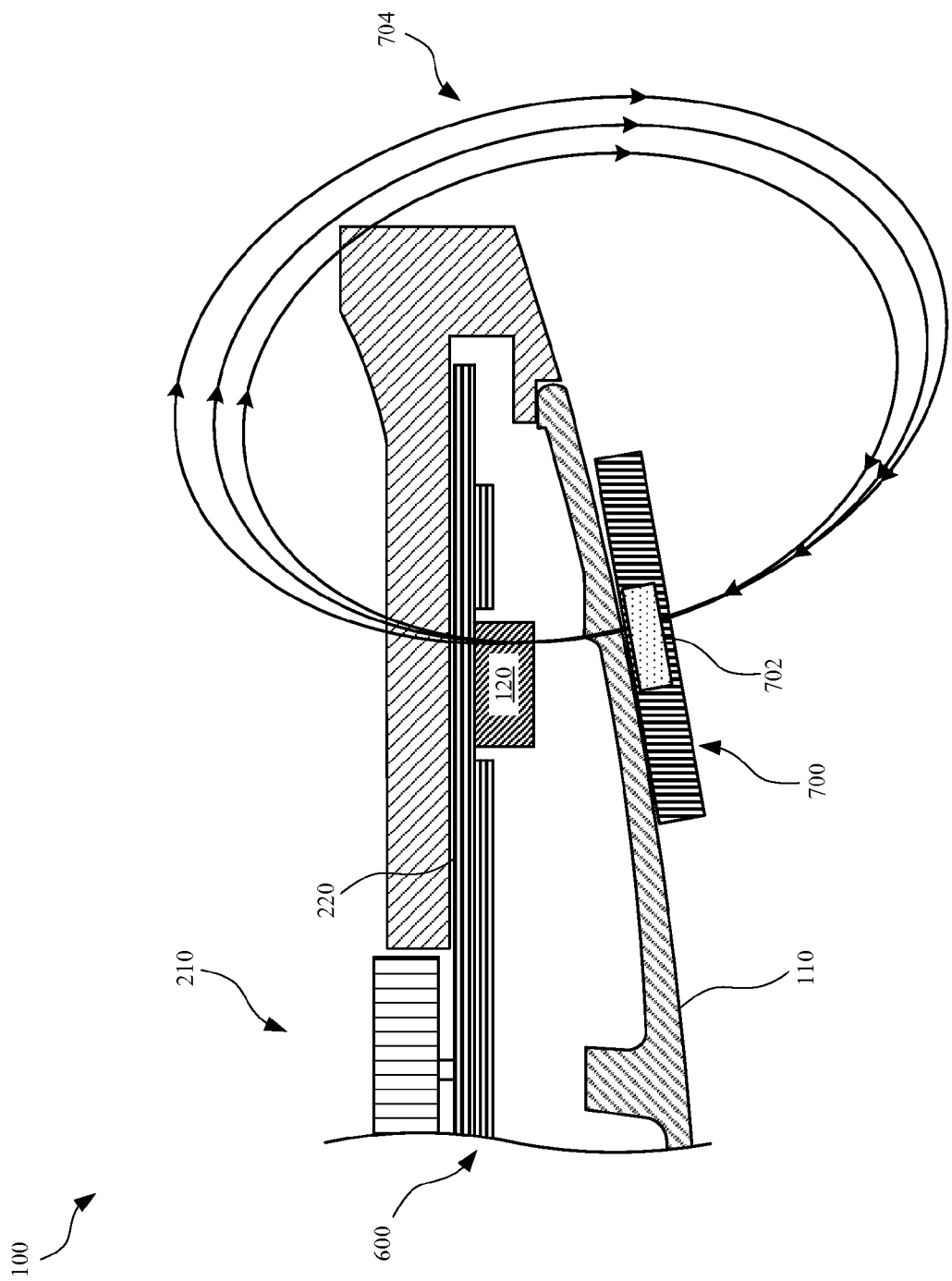

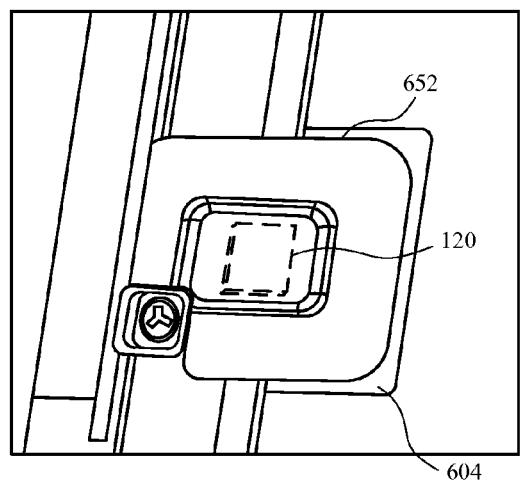
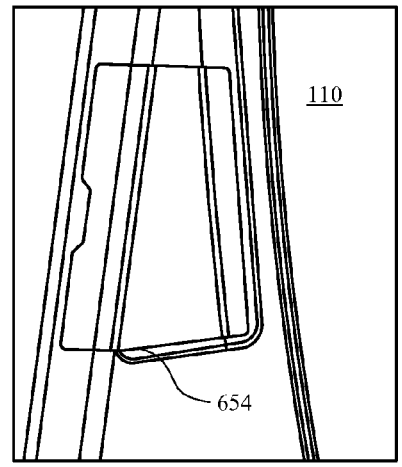
*FIG. 26*    *FIG. 27*
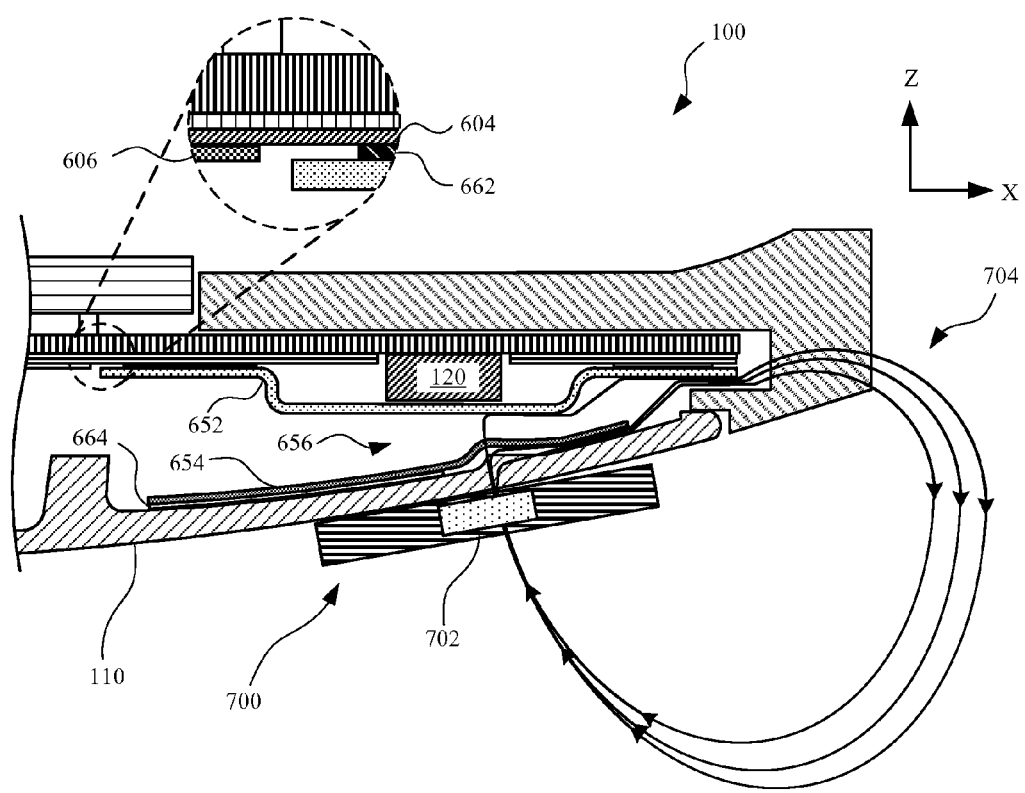
*FIG. 28*

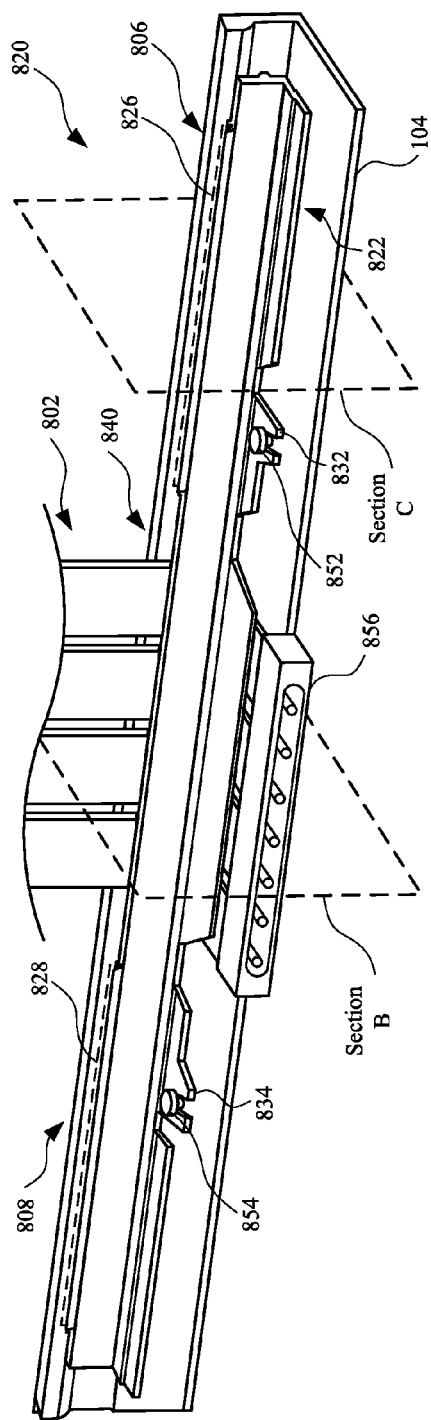
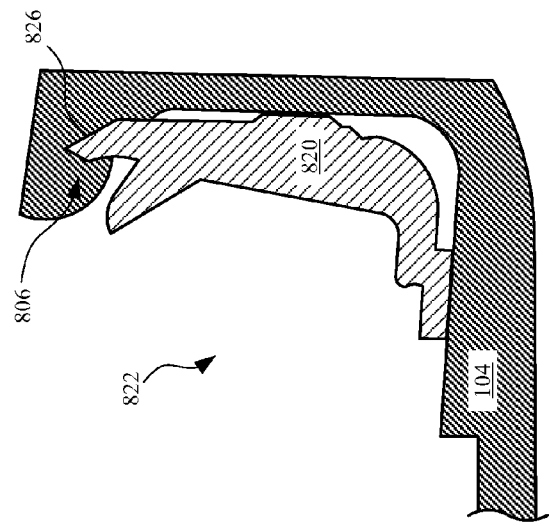
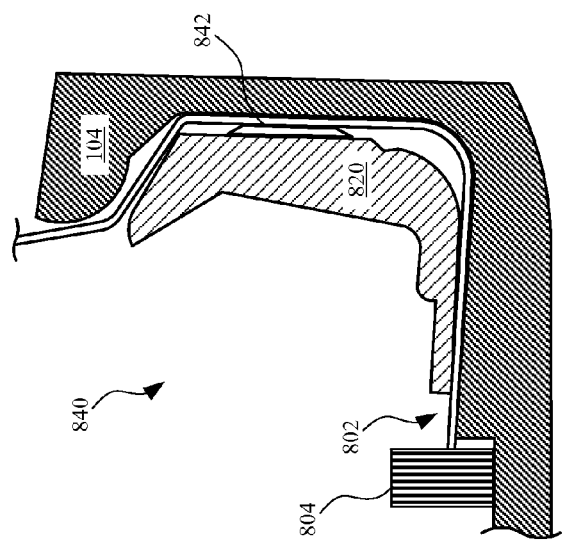
FIG. 33
FIG. 34
FIG. 35

RETENTION FEATURES OF A PORTABLE COMPUTER

CROSS-REFERENCE TO RELATED APPLICATION

This application claims the benefit of priority under 35 U.S.C §119(e) to i) U.S. Provisional Application No. 62/106,687, filed on Jan. 22, 2015, and titled "Enclosure Features of a Portable Computer"; ii) U.S. Provisional Application No. 62/106,689, filed on Jan. 22, 2015, and titled "Keyboard Structure and Retention Features of a Portable Computer"; iii) U.S. Provisional Application No. 62/111,036, filed on Feb. 2, 2015, and titled "Enclosure Features of a Portable Computer,"; and iv) U.S. Provisional Application No. 62/111,042, filed on Feb. 2, 2015, and titled "Keyboard Structure and Retention Features of a Portable Computer", the disclosure of each is incorporated herein by reference in its entirety.

FIELD

The described embodiments relate generally to portable electronic devices. In particular, the present embodiments relate to features used to assemble a portable electronic device and its various features.

BACKGROUND

Portable electronic devices are known to include an enclosure that receives internal components. For instance, the enclosure may include a bottom portion that stores several internal components, such as a battery and a processor circuit. The enclosure may further include a top portion coupled with the bottom portion. The top portion may include components such as a visual display and a camera. Typically, the top portion is designed to pivot with respect to the bottom portion in order to present the portable computing device in an open configuration or a closed configuration. In order to provide electrical current to the visual display and the camera, a flexible circuit may be electrically coupled with the battery as well as the processor circuit, and may also extend from the bottom portion to the top portion.

However, this presents several challenges. For instance, the flexible circuit may be coupled with an electrical connector designed to mate with an integrated circuit within the display housing. Each time the top portion is actuated to pivot about the bottom portion, a force is applied to the flexible circuit which may cause the flexible circuit to decouple with the electrical connector. As a result, there is a loss of power and/or data communication between components in the bottom portion and components in the top portion. Also, the flexible circuit may become visible to an end user of the portable computing device which is generally undesirable.

Also, current trends in portable computing devices include a portable computing device having a smaller footprint. As a result, the device may include a reduced internal space or volume. This presents several challenges. For instance, the bottom portion of the portable computing device may include a sensor designed to provide an input signal to the portable computing device when the device in or near a closed configuration—when the top portion is sufficiently close to the bottom portion—in order to power down the visual display. One method of doing so includes a Hall Effect sensor capable of detecting a magnetic field produced from a magnet in the top portion. However, other devices including magnets can be detected by the Hall Effect sensor which may induce a "false trigger" which powers down the visual display when the portable electronic device is in an open configuration.

In addition, the bottom portion may include a bottom case that defines a base region of the portable computing device. In addition to the bottom case having a given thickness, the bottom case may further include a curved, or non-linear contour such that when combined with a top case (also part of the bottom portion), a reduced internal volume results. The reduced internal volume may lead to smaller internal components, such as a smaller battery pack. As a result, the portable computing device may operate under a reduced operating time between charging consecutive charges of the battery pack.

SUMMARY

In one aspect, a retention feature for securing a flexible circuit assembly in an enclosure of a portable computing device is described. The retention feature may include a first region including a first extension configured to engage a first undercut region of the enclosure. The retention feature may further include a second region including a second extension configured to engage a second undercut region of the enclosure. The retention feature may further include a central region between the first region and the second region and configured to engage the flexible circuit assembly. In some embodiments, the first extension and the second extension combine with the central region to provide a counteracting force exerted on the flexible circuit assembly when the enclosure pivots with respect to a base portion of the portable computing device.

In another aspect, a portable computing device is described. The portable computing device may include a display housing that includes a display module and a magnet that generates a first magnetic field. The portable computing device may further include a base portion coupled with the display housing. The portable computing device may further include a sensor disposed in the base portion, the sensor configured to detect the first magnetic field of the magnet and generate an electrical signal in response to detecting the first magnetic field. The portable computing device may further include a magnetic shield feature that covers the sensor. The magnetic shield feature may be configured to redirect a second magnetic field away from the sensor to prevent the sensor from generating the electrical signal. Also, the second magnetic field may be generated by an external magnet.

In another aspect, a method for assembling a portable computing device is described. The method may include extending a first protrusion of a foot feature through a first opening of an enclosure. The method may further include extending a second protrusion of the foot feature through a second opening of the enclosure. The method may further include receiving heat at the first protrusion and the second protrusion to melt the first protrusion in a first cavity of the enclosure and to melt the second protrusion in a second cavity of the enclosure. Also, the second cavity may be different from the first cavity.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 25 illustrates a cross sectional view of a sensor in the portable computing device;

FIG. 26 illustrates a plan view of a first magnetic shield feature secured with the circuit board and covering the sensor;

FIG. 27 illustrates a plan view of a second magnetic shield feature secured with the bottom case;

FIG. 28 illustrates a cross sectional view of the portable computing device with the first magnetic shield feature surrounding the sensor and the second magnetic shield feature secured with the bottom case;

FIG. 33 illustrates an isometric view of the retention feature secured with the top portion;

FIG. 34 illustrates a cross sectional view of the central region of the retention feature, taken along Section B in FIG. 33;

FIG. 35 illustrates a cross sectional view of the first end region of the retention feature, taken along Section B in FIG. 33;

Figure 1:
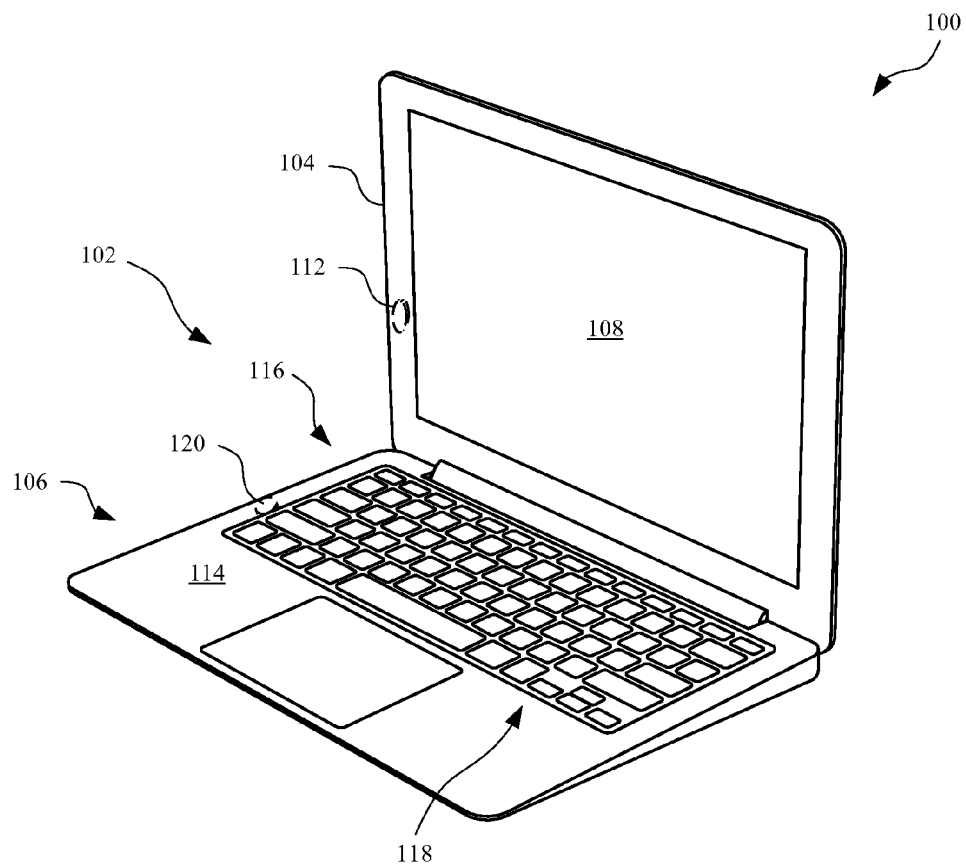
FIG. 1 illustrates an isometric view of an embodiment of a portable computing device in an open configuration.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to a portable computing device. In particular, the disclosure relates to a portable computing device that includes a reduced size and shape, as compared to traditional portable computing devices. Certain structural issues associated with the reduced shape and size can be overcome by one or more features described herein. For example, a portable computing device may include a base portion that includes a top case and a bottom case secured with the top case. In order to reduce the size and shape of the portable computing device, the top case and the bottom case may be reduced. Accordingly, an opening of the top case designed to receive several internal components (such as a processor circuit) is also reduced. In order to receive a keyboard assembly electrically coupled with a circuit board having a size larger than that of the opening, the circuit board can be deformed, or bent, and then positioned within the top case. Further, the circuit board may be deformed without causing damage to the circuit board and the keyboard. This allows the top case to retain its reduced size and shape.

Another challenge with the smaller top case includes securing the circuit board with the top case. For example, several threaded fasteners used to secure the keyboard assembly to the top case must be positioned in a compact region of the top case. To facilitate this process, the threaded fasteners are secured with several threaded cavities formed in the top case at an angle allowing for improved access to the threaded cavities. When the top case is positioned upside down, the angle may be an acute angle with respect to a horizontal plane below the top case. These threaded cavities are formed at each end of the top case. The threaded cavities may also be defined as "blind holes." The phrase "blind hole" as used throughout this detailed description and in the claims refers to an opening or cavity that extends partially, but not completely, through a substrate. In this manner, the substrate may include a first region (or first surface) having a blind hole visible when viewing the first region. The substrate may also include a second region (or second surface) opposite the first region such that when viewing the second surface the blind hole is not visible. The circuit board includes several openings corresponding to the number of threaded cavities of the top case. These openings may extend through the circuit board and may be formed at an angle substantially similar to the angle of the threaded cavities. The circuit board is aligned with the top case when the openings of the circuit board are aligned with the threaded cavities.

Further, a first alignment tool and a second alignment tool may be used to guide the fasteners through the openings of the circuit board and the threaded cavities. Each alignment tool includes a main body and several fastener receivers secured with the main body. The number of fastener receivers may correspond to the number of threaded cavities in the top case. The fastener receivers are formed at an angle substantially similar to the angle of the openings and threaded cavities. The fastener receivers may also be referred to as washers as the fastener receivers are designed to align and secure the threaded fasteners, as well as distribute some of the load exerted by the threaded fasteners. The first alignment tool and the second alignment tool can be positioned at each end of the keyboard assembly. Also, the first alignment tool and the second alignment tool are aligned with the circuit board when the fastener receivers of the first alignment tool and the second alignment tool are aligned with their respective openings in the circuit board. The threaded fasteners may be inserted into the threaded cavities by extending through the fastener receivers, the openings of the circuit board, and the threaded cavities of the top case. Additional securing means may be included, such as additional fasteners in a central region of the keyboard assembly. Further, an adhesive may be applied to a web region of the top case that defines several openings designed to receive the key caps of the keyboard assembly.

The circuit board of the keyboard assembly may include several layers that define a keyboard shield. The keyboard shield serves several functions. For example, a first layer of the keyboard shield may be sealed with the circuit board. In some cases, the first layer is formed from a non-electrically conductive material such as Mylar. The first layer is designed to protect the circuit board as well as other internal components from ingress from contaminants (e.g., dust, liquids). This includes instances when contaminants enter the top case via the web region that receives keys of the keyboard assembly. A second layer may be disposed on the first layer. In some cases, the second layer is formed from an electrically conductive material, such as aluminum or aluminum foil. The second layer provides several features. For example, the second layer provides a portion of an electrical grounding path for internal components electrically coupled with the second layer. Also, the second layer may provide an electromagnetic interference ("EMI") shield for the circuit board against EMI emitted from internal components. As a result, the second layer may block transmission of electromagnetic energy and/or remove electrical current from some internal components in the device that may otherwise cause a reduction in sensitivity, or "desense," of other internal components.

The keyboard assembly can be further secured with the web region of the top case via several threaded fasteners extending through a central region of the keyboard assembly and through threaded cavities in the web region. As a result, both the first layer and the second layer of the keyboard shield may include several openings, with the openings of the first layer aligned with the openings of the second layer.

These openings in the first layer and the second layer are designed to receive a portion of the threaded fasteners (for example, a head portion) located throughout the web region.

The keyboard shield may further include a third layer disposed on the second layer. Generally, the third layer is a continuous layer that includes only a few customized openings designed to allow some internal components to electrically connect to the second layer. Otherwise, the third layer, combined with the first layer and the second layer, combine to define several blind holes as the first and second layers include several openings (described above) and the third layer is substantially free of such openings. Also, keyboard shield may include a tail member. The tail feature may be formed from a material or materials having a relatively low coefficient of friction (for example, Teflon). The tail feature is affixed to the keyboard shield in a manner such that the tail feature is proximate to a moving part of the top portion of the portable computing device. The moving part may engage a region of the base portion of the portable computing device causing friction or even unwanted material removal. However, the tail feature is positioned between the moving part and the top portion to engage the moving part allowing the moving part to slide or glide across the tail feature thereby reducing friction or material breakdown between regions of the top portion and the base portion.

Still, other issues are associated with a compact portable computing device. In some cases, the circuit board of the keyboard assembly includes a sensor, such as a Hall Effect sensor, designed to detect a magnetic field. In particular, the sensor is designed to detect a magnetic field produced by a magnet located in a top portion (for example, a display housing) of the portable computing device. In this manner, when the top portion rotates, or pivots, sufficiently in a direction toward the base portion, the sensor detects the magnetic field. Then, the sensor can provide an electrical input signal to, for example, a processor circuit causing a display module of the portable computing device to shut down or enter an inactive mode. However, due to the relatively small footprint of the base portion, a magnetic field produced by a magnet external with respect to the portable computing device may be detected by the sensor, even when the magnet is positioned below the base portion, causing the sensor to input a "false trigger" to the main logic board, and shut down or deactivate the display module.

In order to reduce, or even eliminate, the false trigger, the base portion may include a first magnetic shield feature. The first magnetic shield feature may be in the shape of a can designed to cover a region of the sensor. The third layer of the keyboard shield may include an opening allowing the first magnetic shield feature to electrically couple with the second layer of the keyboard shield via a conductive adhesive. The first magnetic shield feature is designed to provide a magnetic shield for the sensor to divert unwanted magnetic fields. The base portion may further include a second magnetic shield feature below the first magnetic shield feature. The second magnetic shield feature may be coupled with the bottom case via an adhesive and further shield the sensor from unwanted magnetic fields. The adhesive may include a conductive adhesive and/or a non-conductive adhesive. Also, the first magnetic shield feature and the second magnetic shield feature may be space apart from each other to define an air gap which further facilitates diversion of the magnetic field.

Also, one or more flexible circuits may be positioned in both the top portion and extend to the base portion. The flexible circuits are designed to carry data communications between components in the base portion and the top portion. Further, the flexible circuits may supply power from a battery pack located in the base portion to one or more internal components located in the top portion. The flexible circuits may be coupled with an electrical connector in the top portion. However, when the top portion rotates or pivots with respect to the base portion, a force is applied to the flexible circuits can cause the flexible circuits to decouple from an electrical connector in the top portion.

In order to offset this force, a retention feature can be installed in the top portion. The retention feature can include multiple extensions used to hook the retention feature into undercut regions of the top portion. The retention feature can further include multiple mounting structures that receive fasteners to further secure the retention feature with the top portion. Also, the retention feature can be formed from an injection molding process using a lightweight polycarbonate material that includes glass fiber. In some cases, the retention feature can be formed with an arch-shaped, or bowed, configuration. For example, a central region of the retention feature may be generally flat while the regions near the edges may be curved. In this manner, the retention feature is designed to apply a preload force to the flexible circuits when the retention feature is installed in the top portion.

In order to provide additional space in the portable computing device, an interior region of the bottom case may undergo a material removal process. The material removal process may define several terraced, or stepped, regions. In other words, the bottom case may include various cross sectional elevations. The terraced regions allow the bottom case to receive several internal components, such as battery packs, speaker modules, and/or circuit boards. For example, an internal power supply that includes one or more battery packs can be adhesively secured with one or more terraced regions. Terracing the battery packs in this manner allows for additional volume dedicated to the internal power supply as opposed to a traditional battery pack formed from a rigid, unitary structure and disposed on a flat surface of a traditional bottom case. Accordingly, the operating times of the portable computing device between consecutive charges of the battery packs may increase over the traditional portable computing devices. Although terracing the bottom case requires material removed from the bottom case that can reduce structural rigidity of the bottom case, the internal components, such as the battery packs, when secured with the bottom case, provide structural support to the bottom case.

An exterior region of the bottom case can include several foot features designed to engage a surface on which the portable computing device is positioned. However, the terraced region previously described reduces the available thickness of the bottom case to secure the foot features with the bottom case. To maximize the available space for the foot features, a vision system is used to locate the regions of the exterior region of the bottom case in which the foot features may be optimally positioned. A cutting tool, such as a laser ablation tool, can remove material from the exterior region to define the locations of the foot features. The vision system can account for the terraced region and determine the areas of sufficient thickness. Also, a cutting tool can remove additional material to define several openings in the bottom case. Each foot feature may include several protrusions corresponding to the number of openings in the bottom case for each foot feature. Each foot feature is installed by extending the protrusions through the openings of the bottom case from the exterior region of the bottom case to the interior region. Then, a heat deforming member, such as a heat staking tool, capable of deforming, or melting, the protrusions engages the protrusions from the interior region and applies heat to the protrusions. The material from the resultant, deformed protrusions is positioned within a cavity such that each foot feature is mechanically interlocked with the bottom case. Further, the material from the deformed protrusions lies in the cavity and is sub-flush, or below, the interior region. In this manner, the material does not engage and disturb internal components proximate to the foot features.

These and other embodiments are discussed below with reference to FIGS. 1-46. However, those skilled in the art will readily appreciate that the detailed description given herein with respect to these Figures is for explanatory purposes only and should not be construed as limiting.

FIG. 1 illustrates an isometric view of an embodiment of a portable computing device 100 in an open configuration. The portable computing device 100 includes an enclosure 102 designed to hold several internal components. In some embodiments, the enclosure 102 is formed from plastic. In the embodiment shown in FIG. 1, the enclosure 102 is made from a metal, such as aluminum. The enclosure 102 can be divided into a top portion 104 and a base portion 106, with the top portion 104 is designed to pivot or rotate with respect to the base portion 106. Also, the top portion 104 may be referred to as a display housing as the top portion 104 may include a display module 108 designed to display visual content. Further, the top portion 104 may include a magnet 112 hidden from view. The magnet 112 may generate a magnetic field (not shown) that extends externally with respect to the top portion 104. The base portion 106 includes a top case 114 and a bottom case (shown later) secured with the top case 114. As shown, the top case 114 includes several openings defining a web region 116 allowing the key caps 118 of a keyboard assembly to extend through the web region 116. Also, the base portion 106 may further include a sensor 120. In some embodiments, the sensor 120 is a Hall Effect sensor designed to detect a magnetic field. For example, when the top portion 104 pivots in a direction toward the base portion 106, the top portion 104 may be positioned sufficiently close to the base portion 106 such that the sensor 120 can detect the magnetic field from the magnet 112. Accordingly, the magnet 112 may be defined as a triggering magnet designed to generate a triggering magnetic field detectable by the sensor 120. Once the magnetic field is detected, the sensor 120 is further designed to generate, or trigger, an electrical signal that may cause the display module 108 to shut down and cease displaying visual content.

Figure 2:
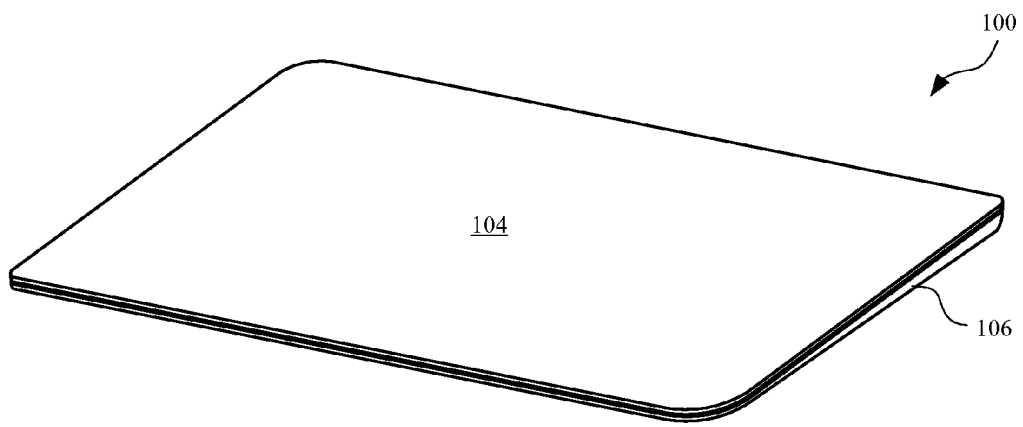
FIG. 2 illustrates an isometric view of the embodiment of the portable computing device shown in FIG. 1 in a closed configuration.

FIG. 2 illustrates an isometric view of the embodiment of the portable computing device 100 shown in FIG. 1 in a closed configuration. The closed configuration of the portable computing device 100 is achieved, for example, by rotating or pivoting the top portion 104 to the base portion 106 such that the top portion 104 is approximately parallel with respect to the base portion 106. The closed configuration shown in FIG. 2 defines one example of when the sensor 120 can detect the magnetic field generated by the magnet 112 (shown in FIG. 1).

Figure 3:
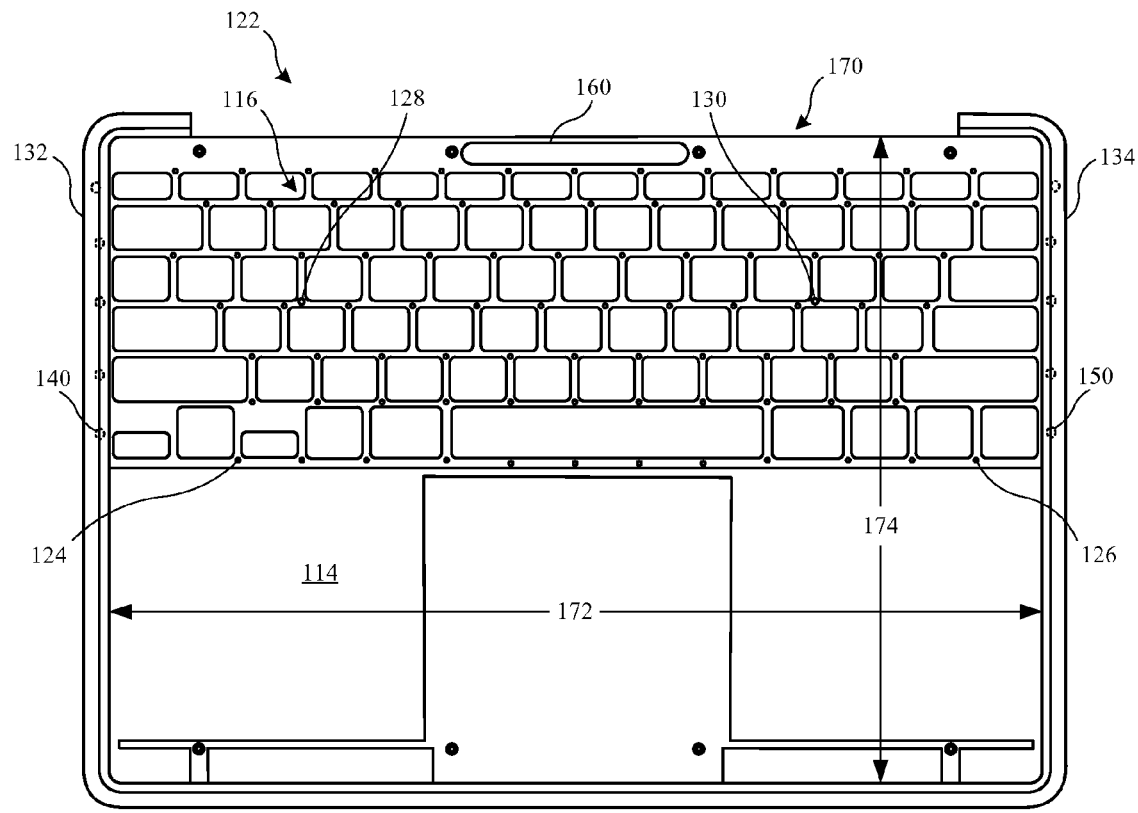
FIG. 3 illustrates a bottom view of an interior region of a top case, in accordance with the described embodiments.

FIG. 3 illustrates a bottom view of an interior region 122 of the top case 114, in accordance with the described embodiments. As shown, the web region 116 includes several central cavities, each of which is designed to receive a fastener to secure an internal component (for example, a keyboard assembly) with a central region of the top case 114. For example, the web region 116 includes a first central cavity 124 and a second central cavity 126. In some embodiments, the first central cavity 124 and the second central cavity 126 are internally threaded in order to receive a threaded fastener. Further, the first central cavity 124 and the second central cavity 126 may be blind holes visible only from the bottom view shown in FIG. 3. Also, the web region 116 may further include a first alignment pin 128 and a second alignment pin 130, both of which extend above a plane defined by the web region 116. The first alignment pin 128 and the second alignment pin 130 are used to align a keyboard assembly (not shown). Although the cavities and alignment pins are shown in particular locations of the web region 116, the cavities and alignment pins could be located in other locations of the web region 116.

The top case 114 may further include several side rails used to create space between the top case 114 and a bottom case (not shown). For example, the top case 114 can include a first side rail 132 and a second side rail 134. Also, the top case 114 may include several cavities proximate to the first side rail 132 and the second side rail 134. For example, the first side rail 132 includes a first end cavity 140. In some embodiments, the first end cavity 140, shown as dotted lines, is positioned partially below the first side rail 132 (from a bottom view). In the embodiment shown in FIG. 3, the first end cavity 140 is completely below the first side rail 132. In either case, the first end cavity 140 is positioned between the first side rail 132 and a top portion 136 of the top case 114. Also, in some embodiments, the first end cavity 140 includes an internal threaded region such that the first end cavity 140 may be in threaded engagement with a fastener (not shown). The first end cavity 140 is a representative end cavity of the remaining end cavities (shown as dotted lines) proximate to the first side rail 132. The second side rail 134 opposite the first side rail 132 includes a second end cavity 150, which may also include an internal threaded region. Also, the second end cavity 150 is a representative end cavity of the remaining end cavities (shown as dotted lines) proximate to the second side rail 134. Also, as shown, the second end cavity 150 is positioned between the first side rail 132 and the top portion 136 of the top case 114. The end cavities may be designed and positioned to provide further securing means of an internal component, such as a keyboard assembly. Also, although not shown, the interior region 122 of the top case 114 can receive an adhesive, such as a pressure sensitive adhesive ("PSA"). Moreover, the PSA can be applied to the web region 116. In this manner, a keyboard assembly can be secured with the top case 114 by the PSA prior to inserting the keyboard assembly, and by several fasteners secured to the central cavities of the top case 114 subsequent to inserting the keyboard assembly.

The interior region 122 of the top case 114 also includes a material removal region defined by an indention region 160. The indention region 160 is designed to allow space for moving parts of other components. This will be discussed below. Also, the top case 114 includes an opening 170 defined in part by the first side rail 132 and the second side rail 134. The opening 170 allows the top case 114 to receive several internal. The opening 170 includes a first dimension 172 which may be defined as a length of the opening 170. As shown in FIG. 3, the first dimension 172 may be referred to a widthwise dimension extending approximately from a first end of the web region 116 to a second end of the web region 116 opposite the first end. Also, as shown, the first dimension 172 is greater than a second dimension 174 of the opening 170.

Figure 4:
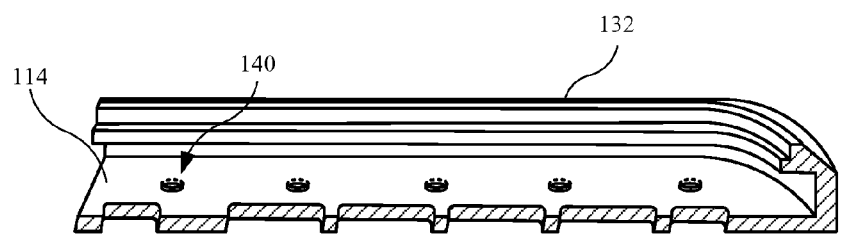
FIG. 4 illustrates an enlarged view of a partial cross section of the top case shown in FIG. 3, showing several end cavities under the first side rail.

FIG. 4 illustrates an enlarged view of a partial cross section of the top case 114 shown in FIG. 3, showing several end cavities (for example, the first end cavity 140) under the first side rail 132. In some embodiments, the end cavities are formed with a vertical configuration with respect to the top case 114. In the embodiment shown in FIG. 4, the end cavities are formed at an angle with respect to the top case 114. The end cavities under the second side rail 134 (shown in FIG. 3) may include a similar features.

Figure 5:
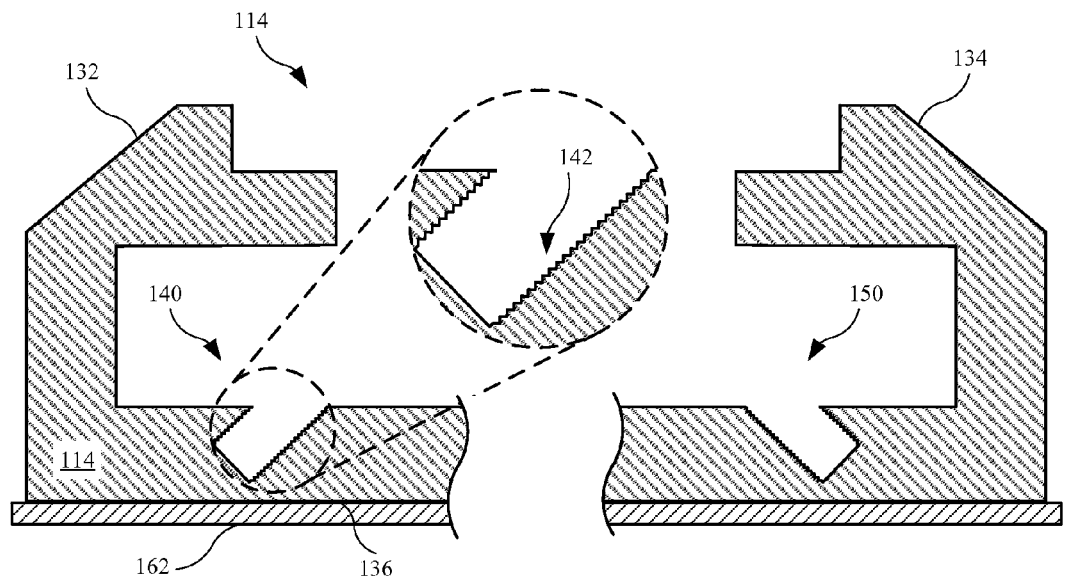
FIG. 5 illustrates a cross sectional view of the first side rail and the second side rail of the top case shown in FIG. 3.

The angle of the end cavities may be designed to facilitate securing fasteners to the end cavities. For example, FIG. 5 illustrates a cross sectional view of the first side rail 132 and the second side rail 134 of the top case 114 shown in FIG. 3. As shown, the first end cavity 140 and the second end cavity 150 are both angled with respect to the top case 114. Each angle may be described as an acute angle with respect to a horizontal plane 162 below the top case 114 when the top case 114 is positioned upside down as shown in FIG. 5. Also, the first end cavity 140 and the second end cavity 150 may include a threaded region. For example, the enlarged view shows the threaded region 142 of the first end cavity 140.

Figure 6:
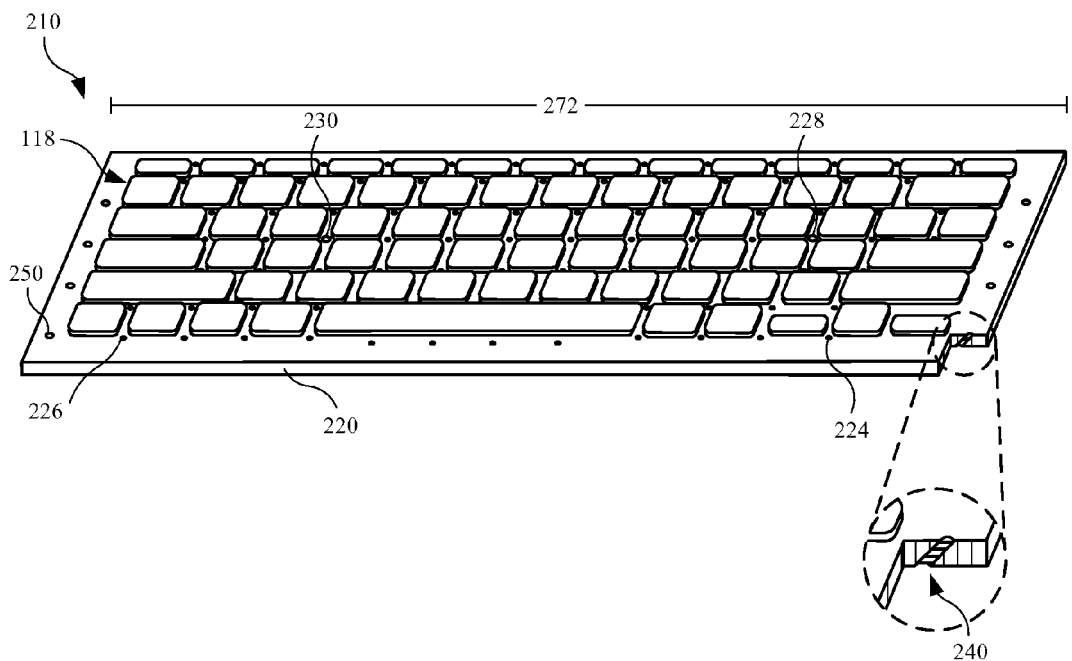
FIG. 6 illustrates an isometric view of an embodiment of a keyboard assembly, in accordance with the described embodiments.

FIG. 6 illustrates an isometric view of an embodiment of a keyboard assembly 210, in accordance with the described embodiments. The keyboard assembly 210 may be an internal component designed for use in the portable computing device 100 (shown in FIG. 1). As shown, the keyboard assembly 210 includes key caps 118 that may be extend through a web region 116 of the top case 114 (shown in FIG. 3). The key caps 118 may include a QWERTY configuration generally known in the art for a keyboard. Also, the key caps 118 may be secured to a circuit board 220. In some embodiments, the circuit board 220 is a printed circuit board. As shown, the circuit board 220 includes several central openings, such as a first central opening 224 and a second central opening 226, both of which extend through the circuit board 220. When the keyboard assembly 210 is installed in the top case 114 (shown in FIG. 3), the first central opening 224 and the second central opening 226 align with the first central cavity 124 and the second central cavity 126 (shown in FIG. 3), respectively. In this manner, each central opening and central cavity can receive a fastener (not shown) to secure the keyboard assembly 210 to the top case 114.

The circuit board 220 can also include a first alignment opening 228 and a second alignment opening 230, both of which extend through the circuit board 220. When the keyboard assembly 210 is installed in the top case 114 (shown in FIG. 3), the first alignment opening 228 and the second alignment opening 230 receive the first alignment pin 128 and the second alignment pin 130 (shown in FIG. 3), respectively, of the top case 114.

The circuit board 220 further includes several end openings, such as the first end opening 240 and the second end opening 250, both of which extend through the circuit board 220. The enlarged view shows include a partial cross sectional view showing the first end opening 240, which may be representative of the remaining end openings of the keyboard assembly 210. When the keyboard assembly 210 is installed in the top case 114 (shown in FIG. 3), the first end opening 240 and the second end opening 250 align with the first end cavity 140 and the second end cavity 150 (shown in FIG. 3), respectively. In this manner, each end opening and end cavity can receive a fastener (not shown) to further secure the keyboard assembly 210 to the top case 114. Also, the partial cross sectional view of the circuit board 220 shows the first end opening 240 formed an angle with respect to the circuit board 220. When the keyboard assembly 210 is installed in the top case 114, the angle is similar to the angle of the cavities (for example, the first end cavity 140 shown FIG. 5) to define a generally continuous and uninterrupted path for a fastener (not shown).

Also, the keyboard assembly 210, and in particular the circuit board 220, includes a first dimension 272 which may be defined as a widthwise dimension of the keyboard assembly 210 extending approximately from a first end beyond the first end opening 240 to a second end beyond the second end opening 250. In some embodiments, the first dimension 272 of the keyboard assembly 210 is greater than the first dimension 172 of the opening 170 (shown in FIG. 3). Accordingly, as shown, the keyboard assembly 210 includes at least one dimension (the first dimension 272) which may not fit into the opening 170 of the top case 114. However, the keyboard assembly 210 is designed to deform or bend without causing damage to the circuit board 220 or other components of the keyboard assembly 210. This will be described and shown below.

Figure 7:
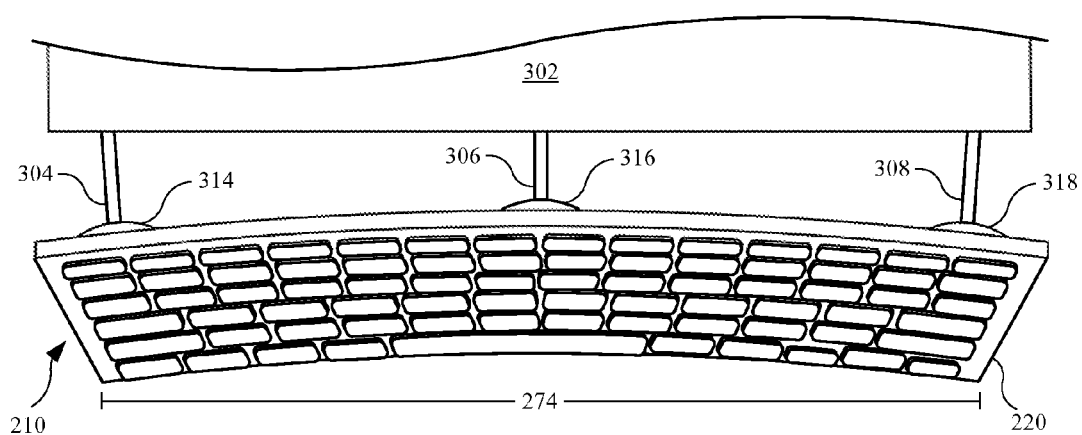
FIG. 7 illustrates an isometric view of the keyboard assembly shown in FIG. 6, with the keyboard assembly secured with a material handling feature.

FIG. 7 illustrates an isometric view of the keyboard assembly 210 shown in FIG. 6, with the keyboard assembly 210 secured with a material handling feature 302. For purposes of simplicity, the previously-described openings in the keyboard assembly 210 are not shown. In some embodiments, the material handling feature 302 is part of a robotic assembly. As shown, the material handling feature 302 includes a first arm 304 having a first attachment feature 314, a second arm 306 having a second attachment feature 316, and third arm 308 having a third attachment feature 318. In some embodiments, the first attachment feature 314, the second attachment feature 316, and the third attachment feature 318 are suction cups capable of engaging the circuit board 220 and securing the keyboard assembly 210 with the material handling feature 302. As shown, the material handling feature 302 can actuate the first arm 304, the second arm 306, and the third arm 308 to combine to apply a deformation force, or bending force, to the keyboard assembly 210 without damaging the keyboard assembly 210 or any of its components, including the circuit board 220. In this manner, the keyboard assembly 210 may be reduced from the first dimension 272 (shown in FIG. 6) to a second dimension 274 defined as a lengthwise dimension less than the first dimension 272. Further, the second dimension 274 may be less than the first dimension 172 of the opening 170 of the top case 114 (shown in FIG. 3). This allows the keyboard assembly 210 to be installed in the top case 114. Accordingly, the keyboard assembly 210 can be defined as a flexible keyboard assembly as the keyboard assembly 210 can flex, or deform, into a bent configuration in response to a force applied to the keyboard assembly 210 by, for example, the material handling feature 302. Further, the circuit board 220 can be formed from a flexible substrate.

Figure 8:
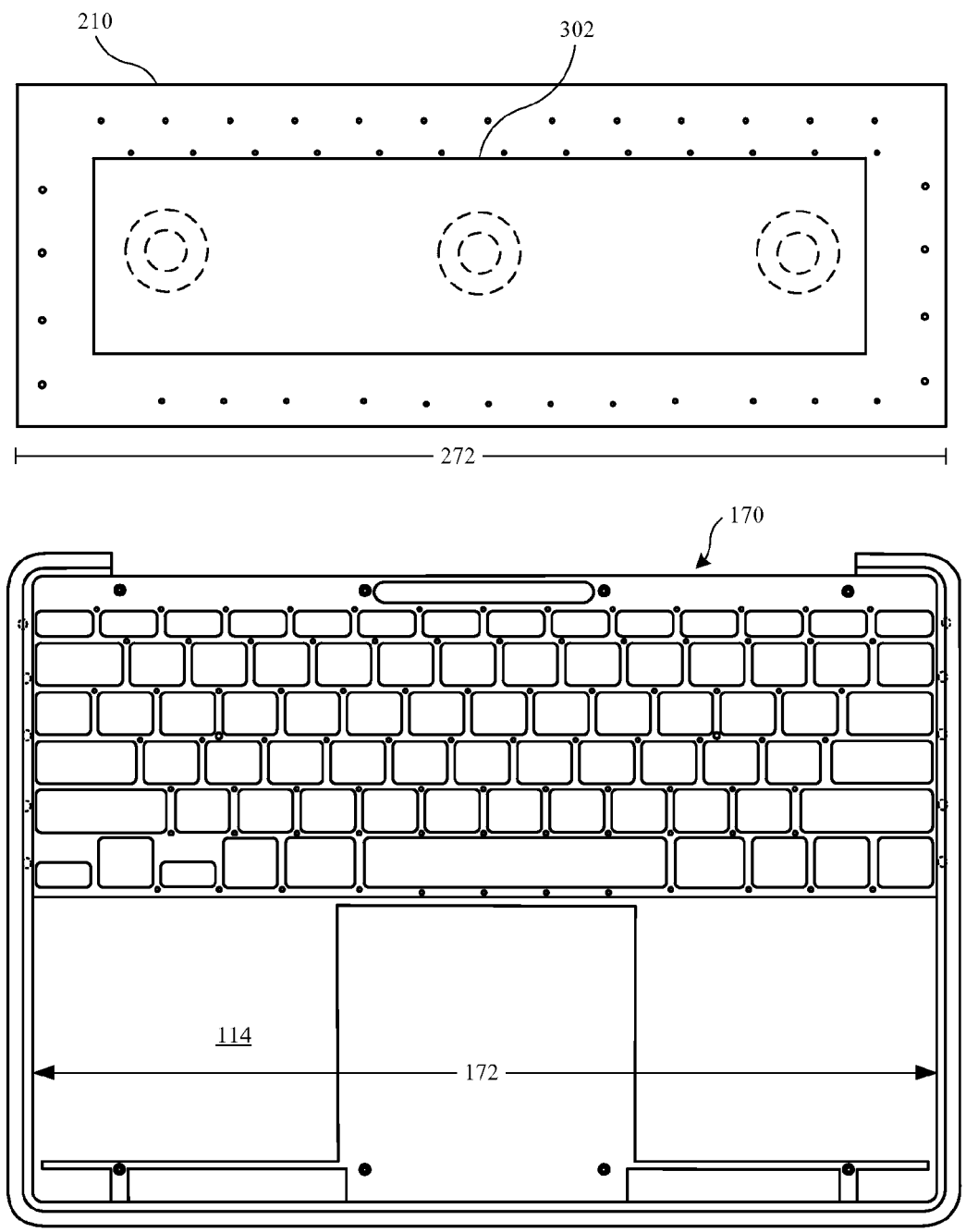
FIG. 8 illustrates a plan view of the keyboard assembly secured with the material handling feature shown in FIG. 7, prior to inserting the keyboard assembly into the top case.

FIGS. 8-14 illustrate the process for inserting the keyboard assembly 210 into the top case 114 via the material handling feature 302. FIG. 8 illustrates a plan view of the keyboard assembly 210 secured with the material handling feature 302 shown in FIG. 7, prior to inserting the keyboard assembly 210 into the top case 114. As shown, the first dimension 172 of the opening 170 is smaller than that of the first dimension 272 of the keyboard assembly 210.

Figure 9:
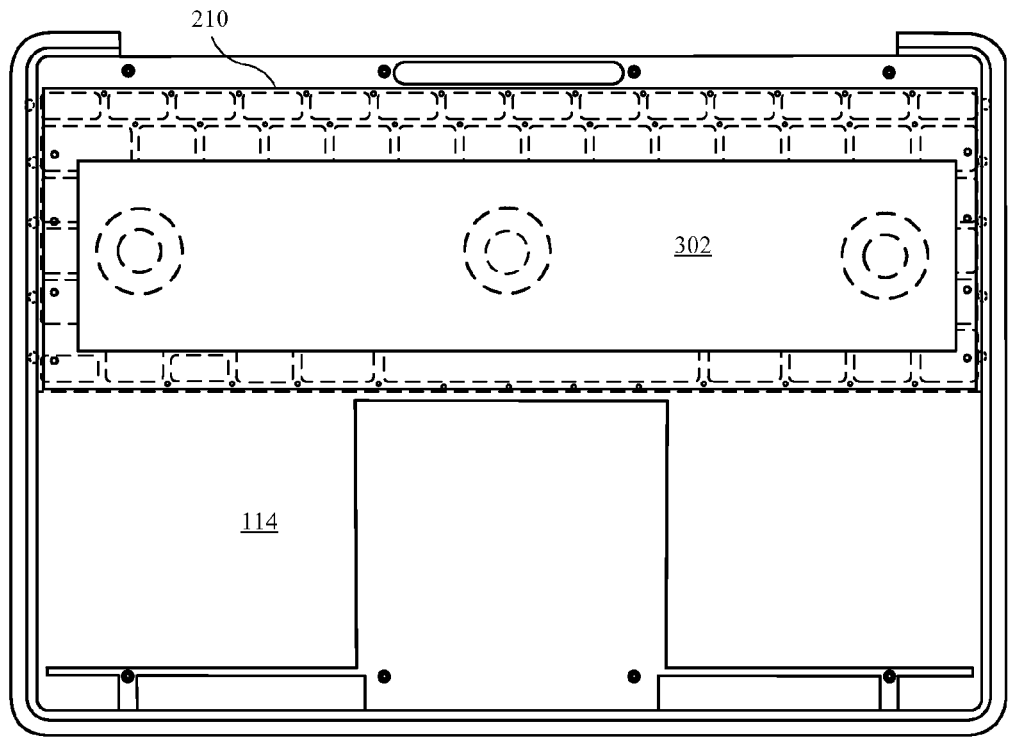
FIG. 9 illustrates a plan view of the material handling feature carrying the keyboard assembly over the top case, in accordance with the described embodiments.
Figure 10:
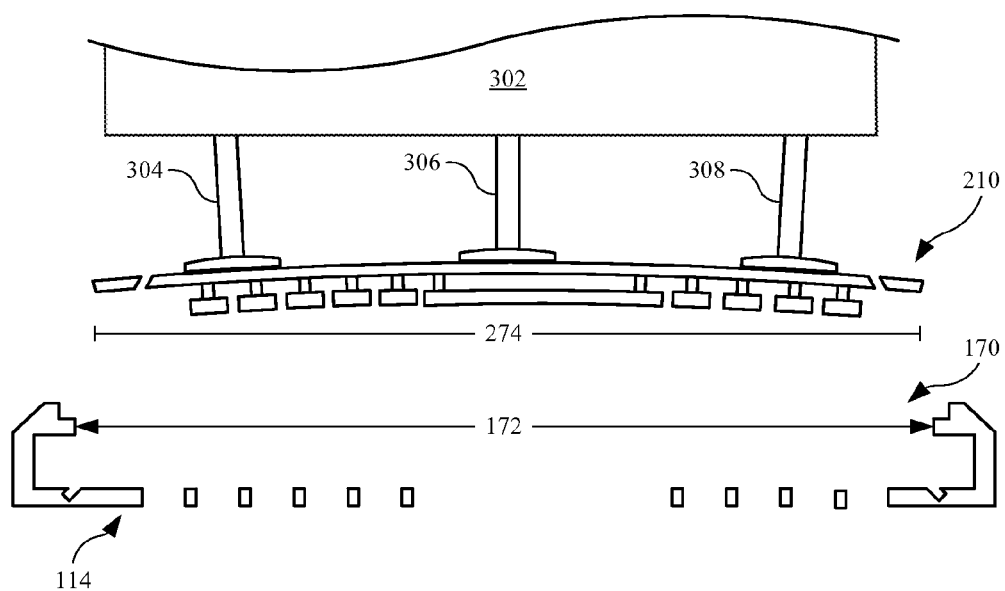
FIG. 10 illustrates a side view of the material handling feature, the keyboard assembly, and the top case shown in FIG. 9.

FIG. 9 illustrates a plan view of the material handling feature 302 carrying the keyboard assembly 210 over the top case 114, in accordance with the described embodiments. FIG. 10 illustrates a side view of the material handling feature 302, the keyboard assembly 210, and the top case 114 shown in FIG. 9. As shown, the material handling feature 302 actuates the first arm 304, the second arm 306, and the third arm 308 to provide a deformation force that deforms the keyboard assembly 210 to the second dimension 274 less than the first dimension 172 of the opening 170 of the top case 114. In this manner, the keyboard assembly 210 includes a reduced size and shape that allows the keyboard assembly 210 to be inserted into the top case 114.

Figure 11:
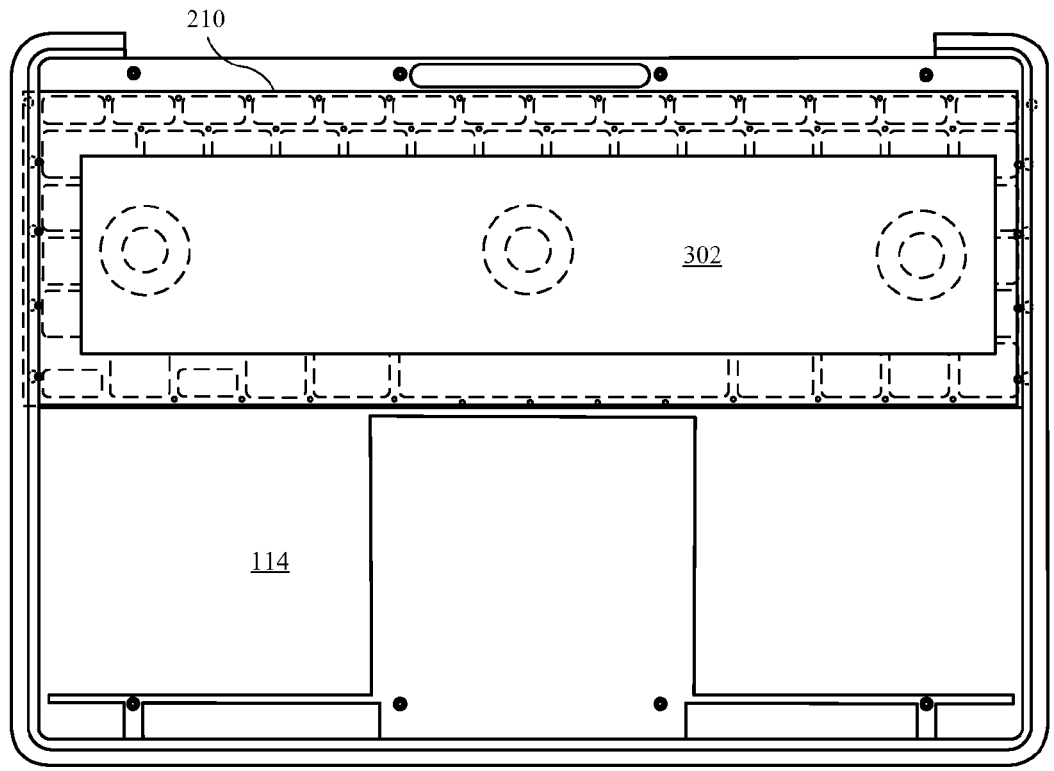
FIG. 11 illustrates a plan view of the material handling feature partially inserting the keyboard assembly into the top case, in accordance with the described embodiments.
Figure 12:
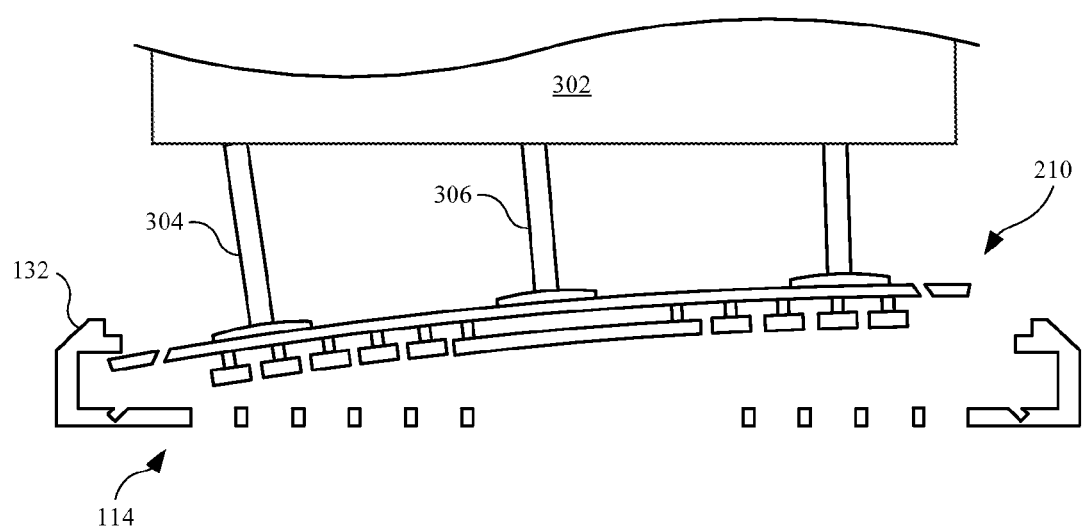
FIG. 12 illustrates a side view of the material handling feature, the keyboard assembly, and the top case shown in FIG. 11.

FIG. 11 illustrates a plan view of the material handling feature 302 partially inserting the keyboard assembly 210 into the top case 114, in accordance with the described embodiments. FIG. 12 illustrates a side view of the material handling feature 302, the keyboard assembly 210, and the top case 114 shown in FIG. 11. As shown, the material handling feature 302 actuates the first arm 304 and the second arm 306 to position a portion of the keyboard assembly 210 below the first side rail 132 of the top case 114.

Figure 13:
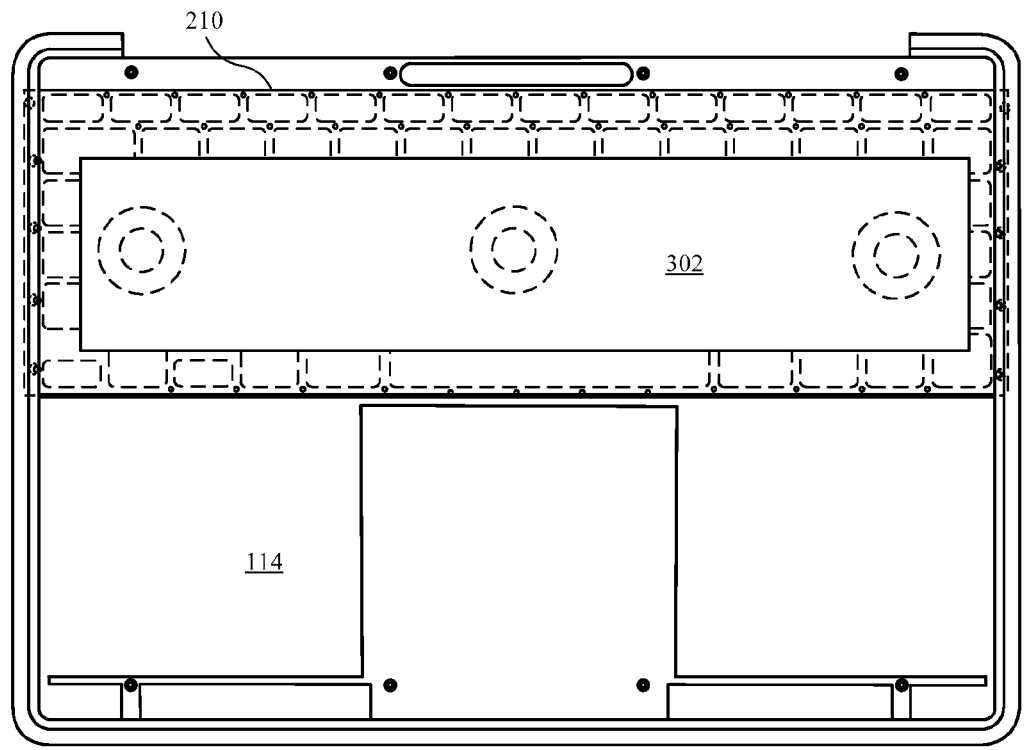
FIG. 13 illustrates a plan view of the material handling feature fully inserting the keyboard assembly into the top case, in accordance with the described embodiments.
Figure 14:
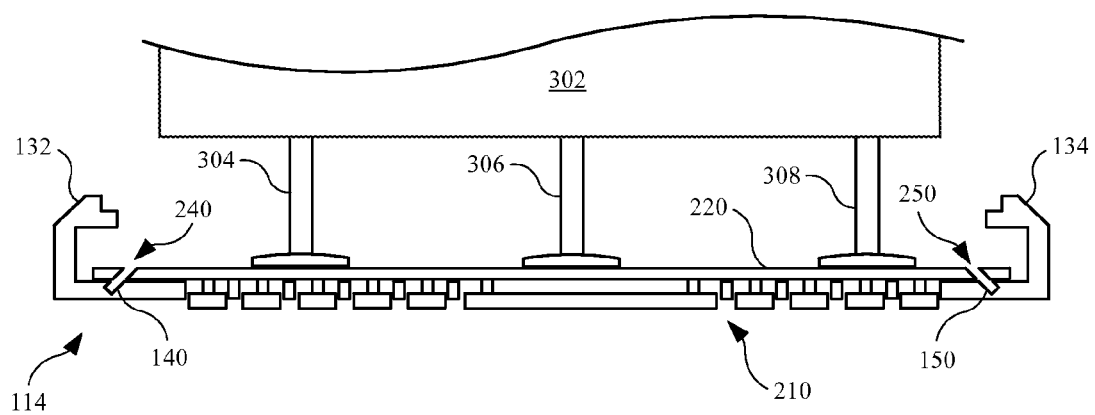
FIG. 14 illustrates a side view of the material handling feature, the keyboard assembly, and the top case shown in FIG. 13.

FIG. 13 illustrates a plan view of the material handling feature 302 fully inserting the keyboard assembly 210 into the top case 114, in accordance with the described embodiments. FIG. 14 illustrates a side view of the material handling feature 302, the keyboard assembly 210, and the top case 114 shown in FIG. 13. The keyboard assembly 210 and the circuit board 220 are now in an unbent configuration. As shown, the material handling feature 302 actuates the first arm 304, the second arm 306, and the third arm 308 such that portions of the keyboard assembly 210 are under the first side rail 132 and the second side rail 134. Also, the material handling feature 302 can position the keyboard assembly 210 such that some of the openings of the keyboard assembly 210 align with some of the cavities of the top case 114. For example, the first end opening 240 and the second end opening 250 of the keyboard assembly 210 are aligned with the first end cavity 140 and the second end cavity 150, respectively, of the top case 114. This allows the end openings and the end cavities to receive a fastener (not shown) to secure the keyboard assembly 210 to the top case 114. It will be appreciated that the remaining end openings are aligned with the remaining end cavities in a similar manner.

Figure 15:
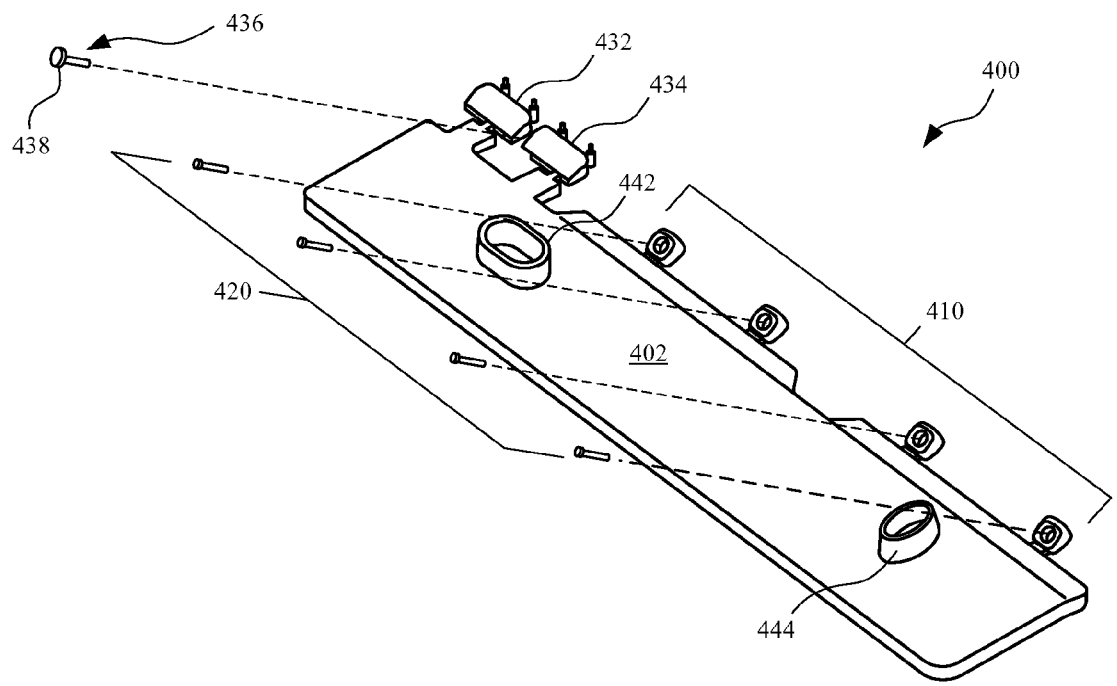
FIG. 15 illustrates an isometric view of an embodiment of an assembly mechanism.

FIG. 15 illustrates an isometric view of an embodiment of an alignment tool 400. The alignment tool 400 may be used to align and secure several fasteners that secure the keyboard assembly 210 to the top case 114 (shown in FIG. 14). As shown, the alignment tool 400 includes a main body 402. In some embodiments, the main body 402 is formed from a metal, such as steel or aluminum. In the embodiment shown in FIG. 15, the main body 402 is formed from a polymeric material, such as plastic. Further, the main body 402 may be formed from a recycled material (or materials) which may facilitate the main body 402 decoupling from other features. This will be described below. Secured with the main body 402 are fastener receivers 410, each of which includes an opening designed to receive one of the fasteners 420. The fasteners 420 may be formed from a metal to provide electrically conductive properties to the fasteners 420. Also, the openings of the fastener receivers 410 are formed at an angle with respect to the main body 402. The angle may be substantially similar to the angle formed in the cavities (such as the second end cavity 150 shown in FIG. 14) and the openings (such as the second end opening 250 shown in FIG. 14) of the keyboard assembly 210. This allows the fasteners 420 to extend through the fastener receivers 410 at an angle substantially similar to the angles formed for the cavities and openings previously described. The fastener receivers 410 are located on the main body 402 such that the fastener receivers are aligned with the angled openings of the keyboard assembly previously described. This may be useful when the end cavities of a top case are positioned between the side rails and the top portion of the top case.

Alternatively, in other embodiments, the fasteners 420 are integrated with alignment tool 400. For example, the alignment tool 400 can be formed such that fasteners 420 are partially captive in the fastener receivers 410. In other words, the formation of the fastener receivers 410 could simultaneously include inserting the fasteners 420 into the fastener receivers 410.

Also, in some cases, the keyboard assembly previously described may include regions having sensitive components. As a result, some regions of the keyboard assembly cannot be disturbed by, for example, an opening in the circuit board used to mount the keyboard assembly. In this manner, the alignment tool 400 may further include a first extension 432 and a second extension 434 secured with the main body 402. The first extension 432 and the second extension 434 are designed to secure a portion of keyboard assembly that does not include an opening to receive a fastener. Also, as shown, the first extension 432 and the second extension 434 can each include an angled portion formed at an angle substantially similar to the angled end openings and the angled end cavities previously described. A fastener 436 positioned between the first extension 432 and the second extension 434 may include a head portion 438 relatively large in diameter and designed to engage both the first extension 432 and the second extension 434. Further, the fastener 436 may be secured with the top case of a portable computing device at an angle based upon the angled portions of the first extension 432 and the second extension 434. In other embodiments, one or more of the fastener receivers 410 (shown in FIG. 15) replace the first extension 432 and the second extension 434.

Also, in some cases, the portable computing device 100 (shown in FIG. 1) may be assembled using certain automated assembly processes. This may include the use of automated tools (for example, a robotic arm) used to assemble the various internal components. The automated assembly processes may employ a vision system used to locate various features of the portable computing device onto which the components are to be assembled. In this manner, the alignment tool 400 may further include a first alignment feature 442 and a second alignment feature 444 positioned on the main body 402. The first alignment feature 442 and the second alignment feature 444 can be used as datum features used by the vision system, giving the vision system reference points to facilitate the placement of components. Further, in some cases, the first alignment feature 442 and the second alignment feature 444 can receive one or more components to define a stacked configuration of components.

Figure 16:
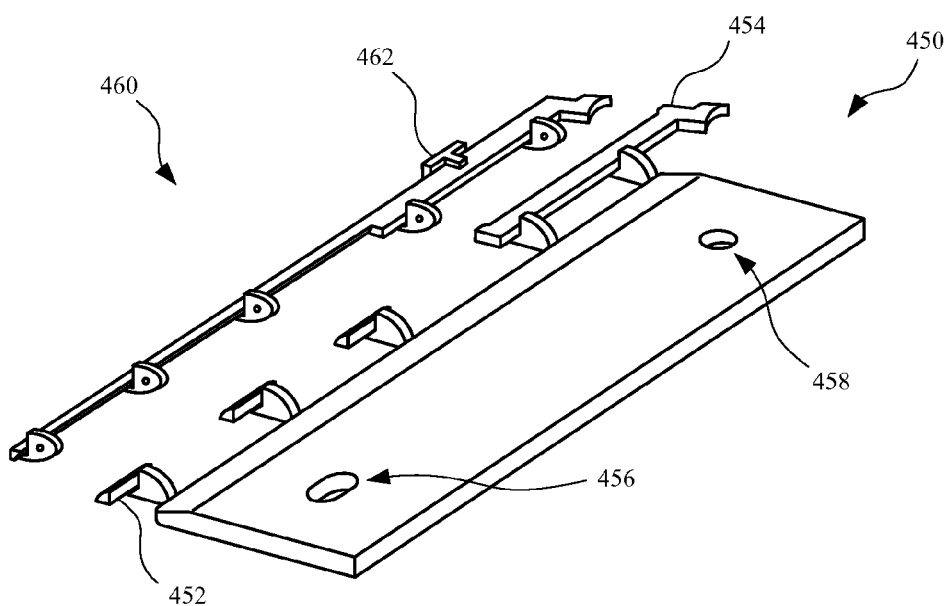
FIG. 16 illustrates an isometric view of an embodiment of an alternate assembly mechanism.

FIG. 16 illustrates an isometric view of an embodiment of an alternate alignment tool 450. In some cases, a side rail (for example, a first side rail 132 shown in FIG. 3) of a top case includes one or more openings. The alternate alignment tool 450 can be used to secure a microphone assembly 460 with the top case 114 (shown in FIG. 4) such that a microphone 462 is aligned with the openings in the side rail. As shown, the alternate alignment tool 450 includes several support mechanisms, such as a first support mechanism 452 and a second support mechanism 454 used to receive the microphone assembly 460. The alternate alignment tool 450 can be made from any material or materials previously described for an alignment tool 400 (shown in FIG. 15). Also, the alternate alignment tool 450 can include a first opening 456 and a second opening 458 which may be used to secure the alternate alignment tool 450 to a top case and/or used as a datum point, or reference, for a vision system previously described.

Figure 17:
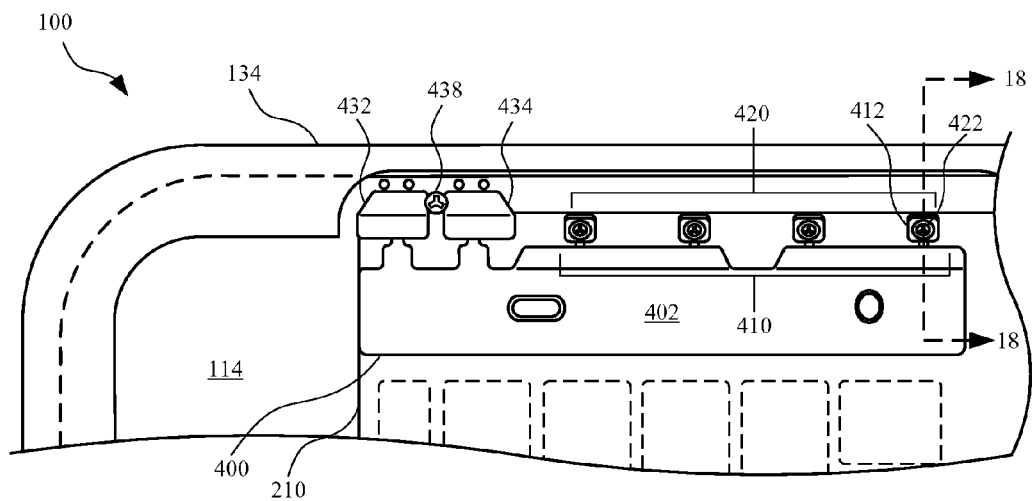
FIG. 17 illustrates a plan view of the alignment tool positioned on the keyboard assembly of the portable computing device.

FIG. 17 illustrates a plan view of the alignment tool 400 positioned on the keyboard assembly 210 of the portable computing device 100. For purposes of illustration, a portion of the second side rail 134 is removed. As shown, each of the fastener receivers 410 secured with the main body 402 receives one of the fasteners 420. For example, FIG. 17 shows a first fastener 422 extending through a first fastener receiver 412. Also, each of the fasteners 420 may extend through end openings (shown in FIG. 6) of the keyboard assembly 210. Further, each of the fasteners 420 may extend through end cavities (shown in FIG. 3) of the top case 114. Also, the head portion 438 (of the fastener 436 shown in FIG. 15) is engaged with the first extension 432 and the second extension 434.

Figure 18:
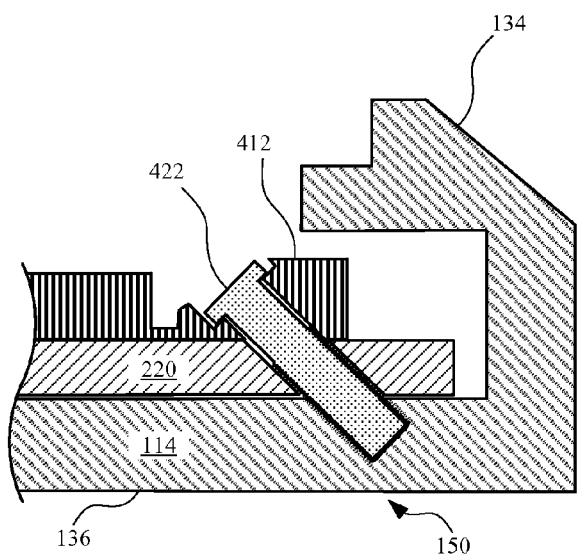
FIG. 18 illustrates a cross sectional view taken along line 18-18 in FIG. 17, showing the first fastener receiver aligning the first fastener with the second end opening of the circuit board and the second end cavity of the top case.

FIG. 18 illustrates a cross sectional view taken along line 18-18 in FIG. 17, showing the first fastener receiver 412 aligning the first fastener 422 with the second end opening 250 of the circuit board 220 and the second end cavity 150 of the top case 114. The angled configuration of the first fastener receiver 412, the second end opening 250, and the second end cavity 150 facilitate the first fastener 422 engaged with the top case 114 at angle. This allows for easier installation when the second end cavity 150 is positioned at least partially between the second side rail 134 and the top portion 136 of the top case 114, as shown in FIG. 18.

Referring again to FIG. 15, in some cases, certain features of the alignment tool 400 are used for datum points for an automated assembly system. However, in some cases, the automated inspection system does not require the datum points. Further, in order to decrease the overall weight of a portable computing device, the main body 402 can be removed after the fasteners 420 and the fastener 436 in secured with the top case 114.

Figure 19:
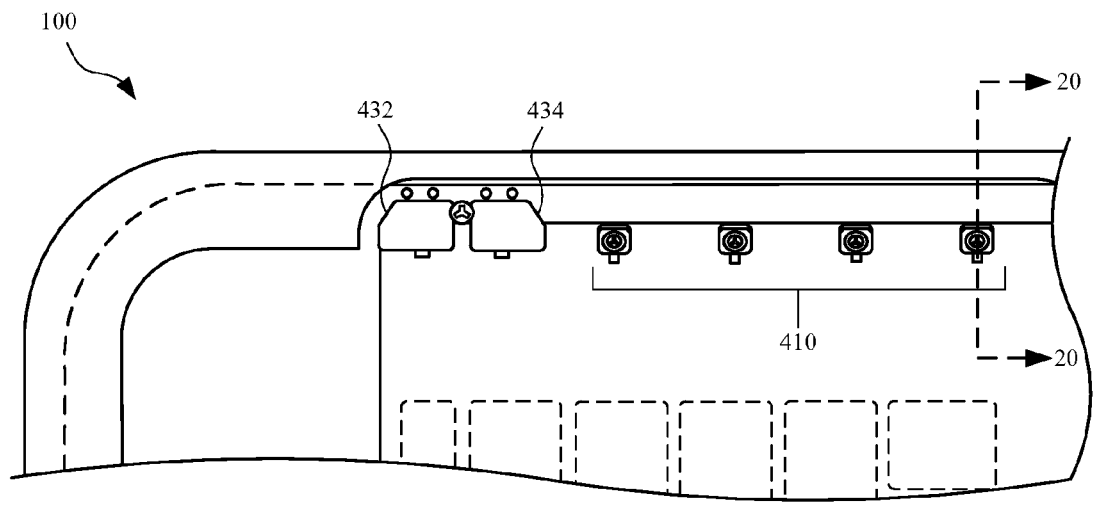
FIG. 19 illustrates a plan view of the alignment tool subsequent to the installation of the fasteners, with the main body removed.

FIG. 19 illustrates a plan view shown in FIG. 17, with the main body of the alignment tool removed subsequent to the installation of the fasteners. With only the fastener receivers 410, the first extension 432, and the second extension 434, the portable computing device 100 can achieve a reduced weight.

Figure 20:
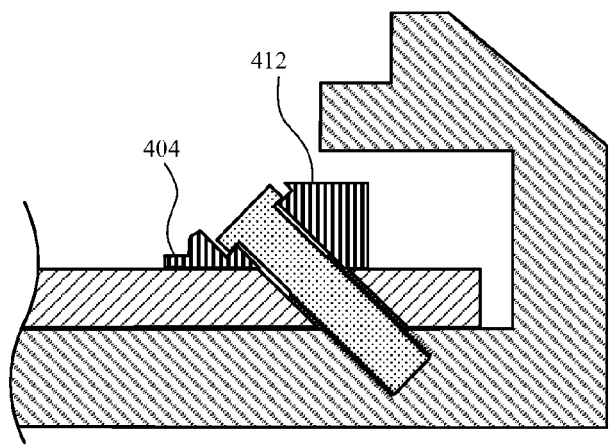
FIG. 20 illustrates a cross sectional view taken along line 20-20 in FIG. 19, showing the first fastener receiver installed.

FIG. 20 illustrates a cross sectional view taken along line 20-20 in FIG. 19, showing the first fastener receiver 412 installed. In some embodiments, a protrusion is positioned on the alignment tool proximate to the fastener receivers. This may allow the main body to more readily break away from the fastener receivers. In the embodiment shown in FIG. 20, the first fastener receiver 412 is attached to a thin region 404 defined as an area of less material thereby facilitating the main body (not shown) breaking away from the first fastener receiver 412. The thin region 404 may be a representative region proximate to each of the fastener receivers 410 (shown in FIG. 19).

Although FIGS. 15-20 illustrate an alignment tool 400 for use with the second side rail 134 of the portable computing device 100, it will be appreciated that an alignment tool having corresponding features can also be used to secure the keyboard assembly 210 to the top case 114 in a region associated with the first side rail 132 (shown in FIG. 3).

Figure 21:
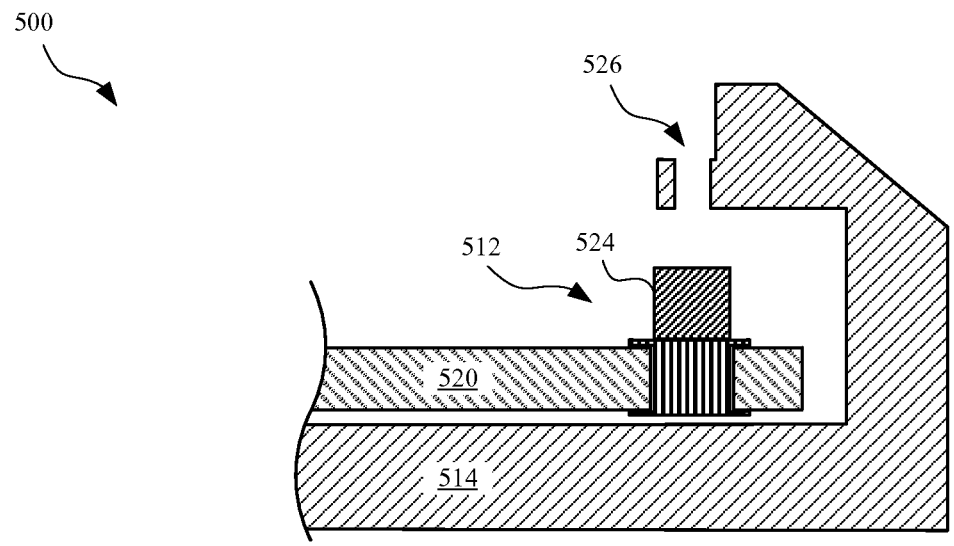
FIG. 21 illustrates a cross sectional view of an alternate embodiment of a portable computing device that includes a retractable fastener as a securing means for a circuit board to a top case.

FIG. 21 illustrates a cross sectional view of an alternate embodiment of a portable computing device 500 that includes a retractable fastener 512 as a securing means for a circuit board 520 to a top case 514, in accordance with the described embodiments. The circuit board 520 may be part of a keyboard assembly (not shown) in accordance with the described embodiments. As shown, the circuit board 520 includes a retractable fastener 512 in threaded engagement with the circuit board 520. The retractable fastener 512 includes a rotatable head 524 capable of actuation by a tool (not shown) extending through an opening 526 of the top case 514.

Figure 22:
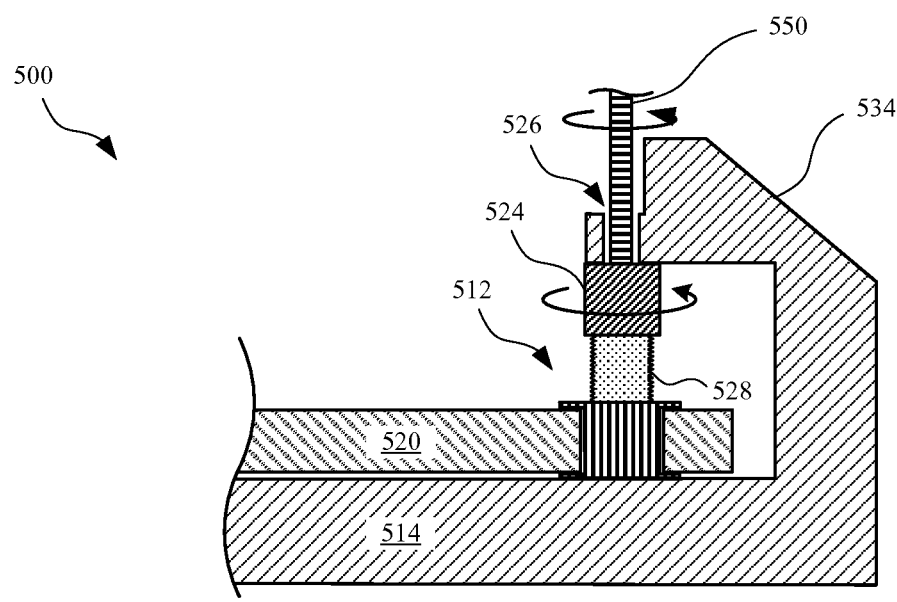
FIG. 22 illustrates a cross sectional view of the portable computing device shown in FIG. 21, with the retractable fastener securing the circuit board to the top case.

FIG. 22 illustrates a cross sectional view of the portable computing device 500 shown in FIG. 21, with the retractable fastener 512 securing the circuit board 520 to the top case 514. The rotatable head 524 rotates about a threaded region 528 of the retractable fastener 512 via a tool 550 extending through the opening 526. As shown, the rotatable head 524 can engage an interior region of a side rail 534. In some embodiments, the tool 550 is a screwdriver. When the rotatable head 524 engages the interior region of the side rail 534, further actuation of the rotatable head 524 may actuate the circuit board 520 in a direction away from the side rail 534. Once the circuit board 520 is positioned in a desired manner, the tool 550 can be removed from the opening 526. Also, the retractable fastener 512 may be a representative fastener and the circuit board 520 may include multiple fasteners similar to the retractable fastener 512.

Figure 23:
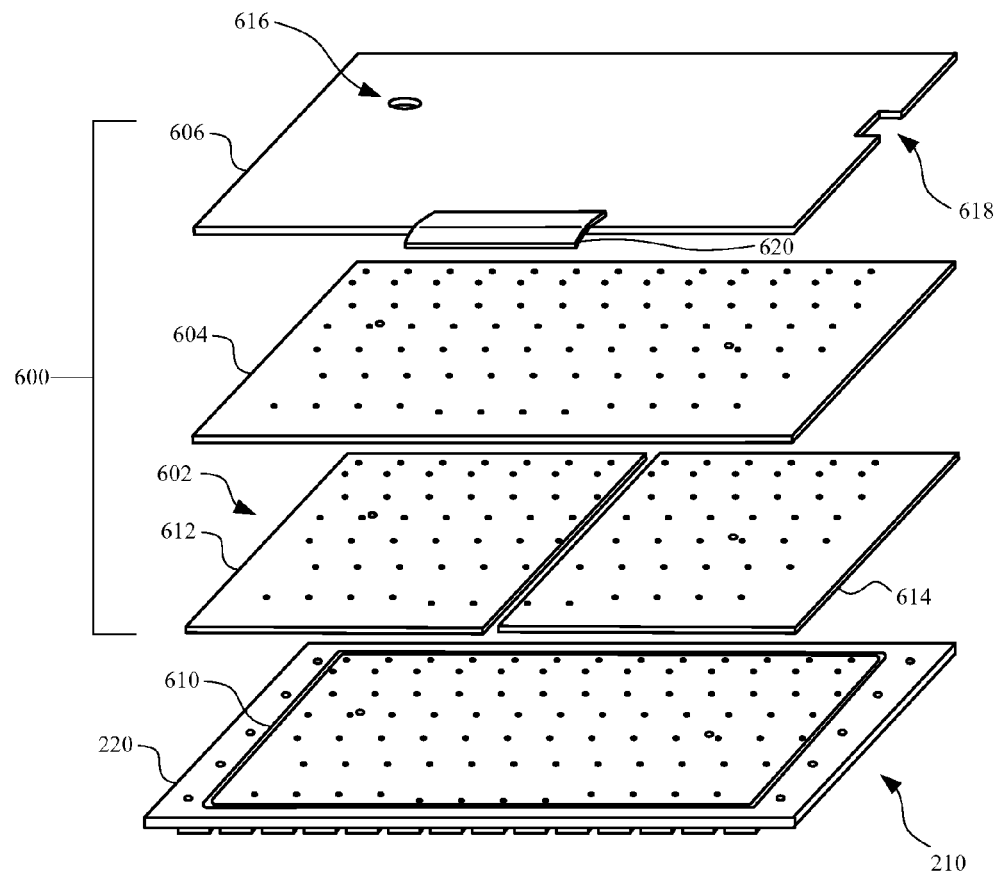
FIG. 23 illustrates an exploded view of several layers defining a keyboard shield used with the keyboard assembly, in accordance with the described embodiments.

FIG. 23 illustrates an exploded view of several layers defining a keyboard shield 600 used with the keyboard assembly 210, in accordance with the described embodiments. The keyboard shield 600 may include several layers offering several features. For example, the keyboard shield 600 may include a first layer 602. In some embodiments, the first layer 602 is formed from a non-electrically conductive material. For example, in some embodiments, the first layer 602 is formed from Mylar. The first layer 602 is designed to seal with a rear portion of the circuit board 220 of the keyboard assembly 210. Also, the first layer 602 is designed to prevent ingress of contaminants from entering the portable computing device 100 via the openings in the web region 116 (shown in FIG. 1) and extending to internal components susceptible to damage from the contaminants. Also, the first layer 602 includes several openings in locations corresponding to the locations of the central openings of the circuit board 220. In this manner, a portion of the fasteners and alignment pins used to secure and align, respectively, the keyboard assembly 210 to a top case (not shown) can extend through the openings of the first layer 602. Further, in some embodiments, the first layer 602 includes a dark color or finish, such as matte black.

Also, in some embodiments, the first layer 602 is formed from a unitary layer. In the embodiment shown in FIG. 23, the first layer 602 is formed from a first section 612 and a second section 614 separate from the first section 612. Further, the first section 612 and the second section 614 may be applied to the circuit board 220 by an embossing procedure. In this manner, first section 612 and the second section 614 can accommodate some of the keys of the keyboard assembly 210, in particular keys in the central region, which may exert a force to the circuit board 220 causing the central region of the circuit board 220 to be non-coplanar, or bow, with respect to remaining regions of the circuit board 220.

The keyboard shield 600 further includes a second layer 604. In some embodiments, the second layer 604 is formed from an electrically conductive material. For example, in some embodiments, the second layer 604 is formed from aluminum, including aluminum foil. The second layer 604 may be electrically connected to the circuit board 220 via a conductive adhesive 610 disposed on the circuit board 220. In this manner, the second layer 604 can define part of an electrical grounding path for components electrically connected to the second layer 604, as the circuit board 220 is electrically connected the top case (not shown) via metal fasteners previously described. Also, similar to the first layer 602, the second layer 604 includes several openings in locations corresponding to the locations of the central openings of the circuit board 220 and the first layer 602, thereby allowing a portion of the fasteners and alignment pins to extend through the openings of the second layer 604. Also, although not shown, the second layer 604 may be formed as a first section and a section in a manner similar to that of the first layer 602.

The keyboard shield 600 may further include a third layer 606. In some embodiments, the third layer 606 is formed from a non-electrically conductive material, such as Mylar. As shown, the third layer 606 includes a first custom opening 616 and a second custom opening 618. The first custom opening 616 and the second custom opening 618 allow internal components of a portable computing device to engage the second layer 604 such that the internal components (not shown) are electrically grounded. Although shown in FIG. 23 in specific locations, the first custom opening 616 and the second custom opening 618 may be formed anywhere throughout the third layer 606 in order to electrically connect an internal component to the second layer 604. In other embodiments, the third layer 606 includes three or more custom openings.

With the exception of the first custom opening 616 and the second custom opening 618, the third layer 606 is free of openings. Accordingly, the first layer 602 and the second layer 604 can combine with the third layer 606 to define several blind holes. In this manner, a portion of the fasteners extending through the first layer 602 and the second layer 604 are generally shielded via the third layer 606 and therefore not visible. Also, in some embodiments, the third layer 606 includes a dark color or finish, such as matte black. Also, although not shown, the third layer 606 may be formed as a first section and a section in a manner similar to that of the first layer 602.

The keyboard shield 600 may further include a tail feature 620. When the keyboard shield 600 is secured with the keyboard assembly 210 and when the keyboard assembly 210 is secured with the top case (not shown) in a manner previously described, the tail feature 620 is disposed in the indention region 160 of the top case 114 (shown in FIG. 3). In some embodiments, the tail feature 620 includes TEFLON. In this manner, the tail feature 620 provides a relatively smooth surface for a moving part of the top portion 104 (shown in FIG. 1). As shown, the tail feature 620 is secured with the third layer 606. However, the tail feature 620 may be secured with the first layer 602 and/or the second layer 604.

Also, although not shown, additional layers may be included with the keyboard shield 600. For example, in some embodiments, a graphite layer is integrated with the first layer 602. The graphite layer may provide improved thermal properties. For example, the graphite layer can absorb heat generated by some internal components to spread the heat throughout the graphite layer. In addition, other layers including materials such as steel, carbon fiber, and/or glass fiber can be used. These layers provide additional protection to, for example, a battery pack that may otherwise be susceptible to rupturing if contacted by an internal component.

Figure 24:
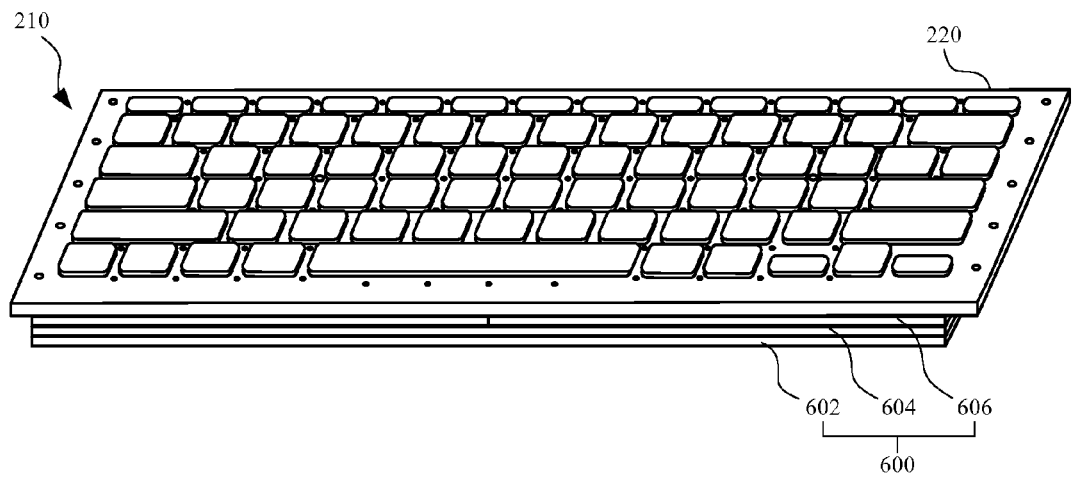
FIG. 24 illustrates an isometric view of the keyboard shield secured with the keyboard assembly.

FIG. 24 illustrates an isometric view of the keyboard shield 600 secured to the keyboard assembly 210. It will be appreciated that, for purposes of illustration, the thickness of the first layer 602, the second layer 604, and the third layer 606 may be exaggerated and not in proportion to the circuit board 220.

The portable computing device described is intended to be smaller and more compact as compared to traditional portable computing devices. Accordingly, several features are smaller and thinner than traditional portable computing devices. This may cause issues with other internal components. For example, FIG. 25 illustrates a cross sectional view of a sensor 120 in the portable computing device 100. For reference, the sensor 120 was previously shown in FIG. 1. As shown in FIG. 25, the sensor 120 can be electrically connected to the circuit board 220 of the keyboard assembly 210. Also, the previously described layers of the keyboard shield 600 may include an opening for the sensor 120. Also, the sensor 120 may be a Hall Effect sensor designed to detect a magnetic field of a magnet in another location of the portable computing device 100. However, due to the portable computing device 100 being relatively small, the sensor 120 can detect magnetic field from magnets external with respect to the portable computing device 100.

FIG. 25 shows an electronic device 700 engaged with the bottom case 110 of the portable computing device 100. The electronic device 700 includes a magnet 702 that generates a magnetic field 704. Although shown in the electronic device 700, the magnet 702 can be any magnet external with respect to the portable computing device 100, either enclosed in a device, as shown, or as a standalone magnet. In some cases, the sensor 120 can detect the magnetic field 704 and send an electrical signal to the portable computing device 100 causing the display module 108 (shown in FIG. 1) to shut down. This unintended consequence of the portable computing device 100 having a smaller form factor can be avoided.

Several modifications can be made to the portable computing device to reduce the effects of an external magnetic field. For example, FIG. 26 illustrates a plan view of a first magnetic shield feature 652 secured with the circuit board 220 and covering the sensor 120. As shown, the first magnetic shield feature 652 is secured with the second layer 604. In some embodiments, the first magnetic shield feature 652 is formed from magnetic steel. The first magnetic shield feature 652 may be referred to as a can designed to shield the sensor from external magnetic fields, such as the magnetic field 704 (shown in FIG. 25). Generally, the first magnetic shield feature 652 can be made from any material capable of deflecting a magnetic field. However, the first magnetic shield feature 652 will not inhibit the sensor 120 from detecting a magnetic field from, for example, a magnet 112 disposed in a top portion 104 of the portable computing device 100 (shown in FIG. 1).

FIG. 27 illustrates a plan view of a second magnetic shield feature 654 secured with the bottom case 110. Like the first magnetic shield feature 652, the second magnetic shield feature 654 is also designed to deflect external magnetic fields. The second magnetic shield feature 654 may be made from any material previously described for the first magnetic shield feature 652.

FIG. 28 illustrates a cross sectional view of the portable computing device 100 with the first magnetic shield feature 652 surrounding the sensor 120 and the second magnetic shield feature 654 secured with the bottom case 110. As shown, the second magnetic shield feature 654 is generally below the first magnetic shield feature 652 in a dimension (for, example a vertical z-dimension). Generally, the first magnetic shield feature 652 and the second magnetic shield feature 654 are positioned in a potential pathway between the sensor 120 and an external magnetic field generated from an external magnet. Accordingly, the first magnetic shield feature 652 and the second magnetic shield feature 654 combine to define a magnetic shield such that the magnetic field 704 generated by the magnet 702 of the electronic device 700 is diverted in a direction away from the sensor 120, as shown in FIG. 28. The first magnetic shield feature 652 and the second magnetic shield feature 654 are designed to divert or redirect any magnetic field other than the magnetic field generated by the magnet 112 (shown in FIG. 1). In this manner, the sensor 120 does not detect the magnetic field 704 and does not generate the electrical signal in response to the magnet 702 in close proximity to the portable computing device 100. Also, an air gap 656 defined as a void or space between the first magnetic shield feature 652 and the second magnetic shield feature 654 can further impede the magnetic field 704 from reaching the sensor 120.

The enlarged view shows a portion of the third layer 606 (of the keyboard shield 600, shown in FIG. 24) partially removed such that the first magnetic shield feature 652 is electrically coupled with the second layer 604 via a first conductive adhesive 662. The first magnetic shield feature 652 is then electrically grounded. Also, the second magnetic shield feature 654 can be adhesively secured with the bottom case 110 with a second conductive adhesive 664 such that the second magnetic shield feature 654 is also electrically grounded. The first magnetic shield feature 652 and the second magnetic shield feature 654 offer a lightweight and low-cost solution. Further, the sensor 120 can be a relatively simplistic sensor used in prior portable computing devices and need not include complex features. Also, the solution achieve the use of less internal components. For example, a second sensor used as a "confirmation" sensor to detect a second magnet (not shown) in the top portion 104 (shown in FIG. 1) is not required.

Figure 29:
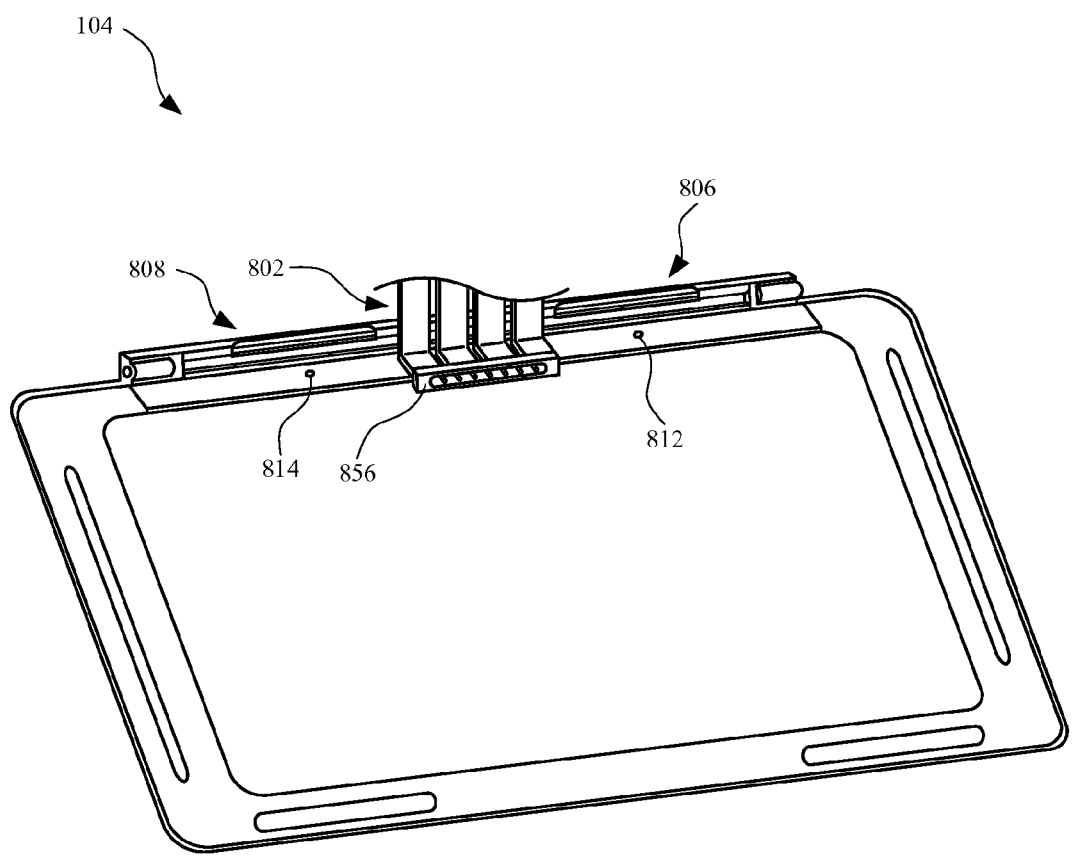
FIG. 29 illustrates an isometric view of an embodiment of a top portion of the portable computing device, in accordance with the described embodiments.

FIG. 29 illustrates an isometric view of an embodiment of a top portion 104 of the portable computing device, in accordance with the described embodiments. The top portion 104 may also be referred to as a display housing. The display module 108 (shown in FIG. 1) of the top portion 104 is removed to show certain structural features of the top portion 104. The top portion 104 can include part of a flexible circuit assembly 802 which may include several flexible circuits are partially disposed within the top portion 104. The flexible circuit assembly 802 may also extend into the base portion 106 (shown in FIG. 1) and electrically connect with one or more components, such as a processor circuit and/or a battery pack. In this manner, the top portion 104 can receive electrical power (from the battery pack) and/or data communication (from the processor circuit) from the base portion 106 via the flexible circuit assembly 802. As shown, the flexible circuit assembly 802 is coupled with a connector 804 that may be connected to an integrated circuit or another flexible circuit (not shown). However, as the top portion 104 may pivot with respect to the base portion 106, some moving parts can exert a force on the flexible circuit assembly 802. In some cases, after several cycles of rotating or pivoting the top portion 104 with respect to the base portion 106, the force exerted on the flexible circuit assembly 802 may cause the flexible circuit assembly 802 to decouple from the connector 804. As a result, the flexible circuit assembly 802 no longer relays power and/or data communication to the top portion 104.

The top portion 104 can be modified to receive a feature designed to counter the forces exerted on the flexible circuit assembly 802. Before installing the feature, the top portion 104 may undergo several material removal processes by a cutting tool (such as a T-cutting tool designed to perform an undercut). For example, the material removal processes can define a first undercut region 806 and a second undercut region 808, both of which may be referred to as a notch designed to receive a portion of a retention feature (described below). Also, the top portion 104 can include a first mounting hole 812 and a second mounting hole 814 designed to secure a retention feature with the top portion 104.

Figure 30:
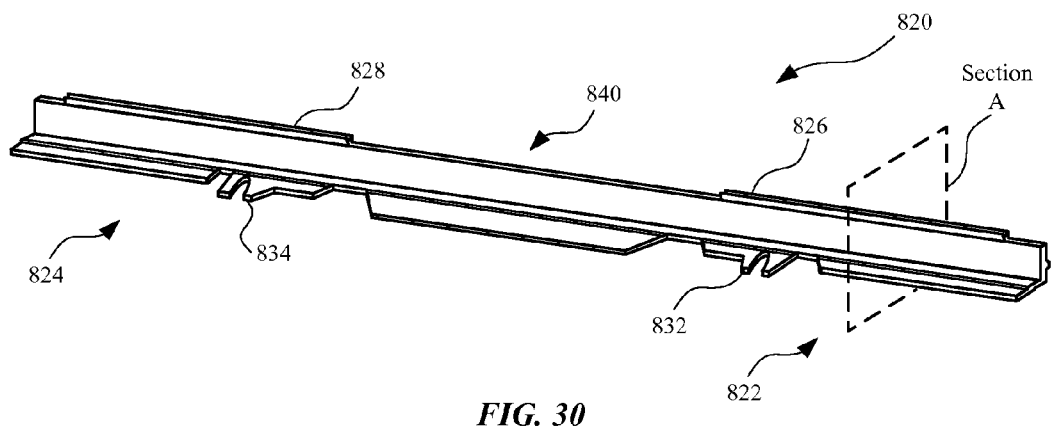
FIG. 30 illustrates a front isometric view of an embodiment of a retention feature.

FIG. 30 illustrates a front isometric view of an embodiment of a retention feature 820, in accordance with the described embodiments. In some embodiments, the retention feature 820 is formed from a metal (such as aluminum). In the embodiment shown in FIG. 30, the retention feature 820 is formed from a polycarbonate material, which may include glass fiber. Further, in some embodiments, the materials used to form the retention feature 820 are injection-molded into a mold cavity (not shown) that defines the size and shape of the retention feature 820. This allows for a retention feature 820 having both a lightweight and custom design that fits into a relatively small space.

The retention feature 820 can include a first end region 822 and a second end region 824 opposite the first end region 822. The first end region 822 and the second end region 824 may include a first extension 826 and a second extension 828, respectively. The first extension 826 and the second extension 828 are designed to enter, or hook, into the first undercut region 806 and the second undercut region 808 (shown in FIG. 29), respectively. In other embodiments, the retention feature 820 includes three or more extensions, and accordingly, the top portion 104 (shown in FIG. 29) includes a corresponding number of undercut regions. Also, the first end region 822 and the second end region 824 may further include a first mounting structure 832 and a second mounting structure 834, respectively. When the retention feature 820 is installed in the top portion 104, the first mounting structure 832 and the second mounting structure 834 align with the first mounting hole 812 and the second mounting hole 814 (shown in FIG. 29), respectively.

The retention feature 820 further includes a central region 840. The central region 840 is designed to engage the flexible circuit assembly 802 (shown in FIG. 29) and combine with the extensions and/or mounting structures (described above) to apply a retention force that counteracts external forces applied to the flexible circuit assembly 802. In this manner, the flexible circuit assembly 802 remains relatively stationary in a location proximate to the connector 804 (shown in FIG. 29) despite multiple pivoting events of the top portion 104 (shown in FIG. 29) with respect to a base portion (such as the base portion 106 shown in FIG. 1).

Figure 31:
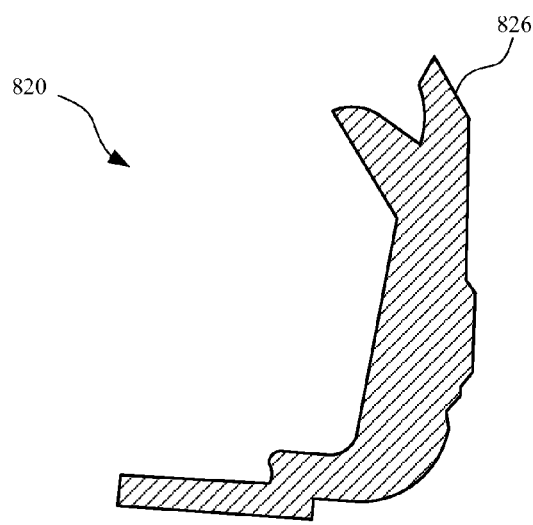
FIG. 31 illustrates a cross sectional view of the retention feature shown in FIG. 30, taken along Section A.

FIG. 31 illustrates a cross sectional view of the retention feature 820 shown in FIG. 30, taken along Section A. As shown, the first extension 826 extends away from the retention feature 820 to engage the first undercut region 806 (shown in FIG. 29). It will be appreciated that the second extension 828 (shown in FIG. 30) includes a substantially similar profile as that of the first extension 826.

Figure 32:
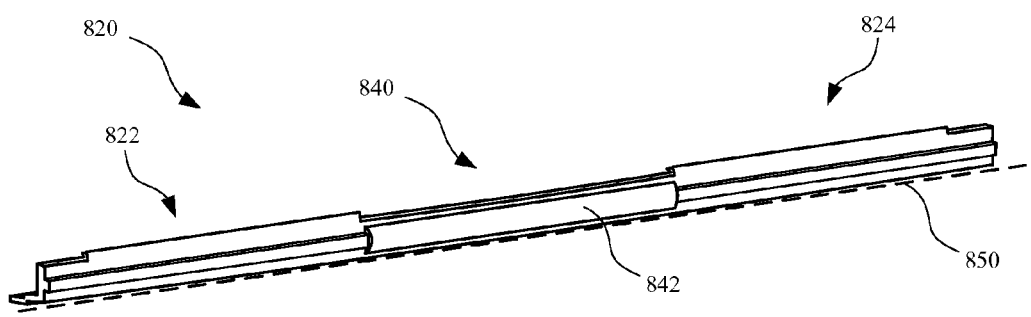
FIG. 32 illustrates a rear isometric view of the retention feature.

FIG. 32 illustrates a rear isometric view of the retention feature 820. As shown, the retention feature 820 can include a compressible member 842 designed to engage the flexible circuit assembly 802 (shown in FIG. 29). In some embodiments, the compressible member 842 is formed from a foam material secured to the central region 840. Also, the retention feature 820 can be arched or bowed to provide a pretension or preload force when installed. For example, as shown, the first end region 822 and the second end region 824 are elevated with respect to the central region 840 to define a bowed configuration. An imaginary horizontal line 850 is included for reference to illustrate the bowed configuration at the first end region 822 and the second end region 824.

FIG. 33 illustrates an isometric view of the retention feature 820 secured with the top portion 104. Only relevant portions of the top portion 104 are shown in FIG. 33. The first extension 826 and the second extension 828 are first inserted, or hooked, into the first undercut region 806 and the second undercut region 808, respectively. In this configuration, the first extension 826, the second extension 828, the central region 840, and the compressible member (not shown) combine to define a counteracting force that counteracts external forces that may decouple the flexible circuit assembly 802 from the top portion 104. In this manner, the flexible circuit assembly 802 remains relatively immobile in a location proximate to the connector 804. Then, the first mounting structure 832 and the second mounting structure 834 receive a first fastener 852 and a second fastener 854, respectively, to secure the retention feature 820 with the top portion 104. This may also increase the counteracting force.

FIG. 34 illustrates a cross sectional view of the central region 840 of the retention feature 820, taken along Section B in FIG. 33. As shown, the compressible member 842 in the central region 840 engages the flexible circuit assembly 802 such that the flexible circuit assembly 802 is engaged with the top portion 104, thereby limiting the overall movement of the flexible circuit assembly 802 in a location proximate to the connector 804.

FIG. 35 illustrates a cross sectional view of the first end region 822 of the retention feature 820, taken along Section C in FIG. 33. As shown, the first extension 826 engages the first undercut region 806 of the top portion 104 to provide part of the counteracting force of the retention feature 820. It will be appreciated that the second extension 828 and the second undercut region 808 (shown in FIG. 33) include substantially similar features and configurations.

Figure 36:
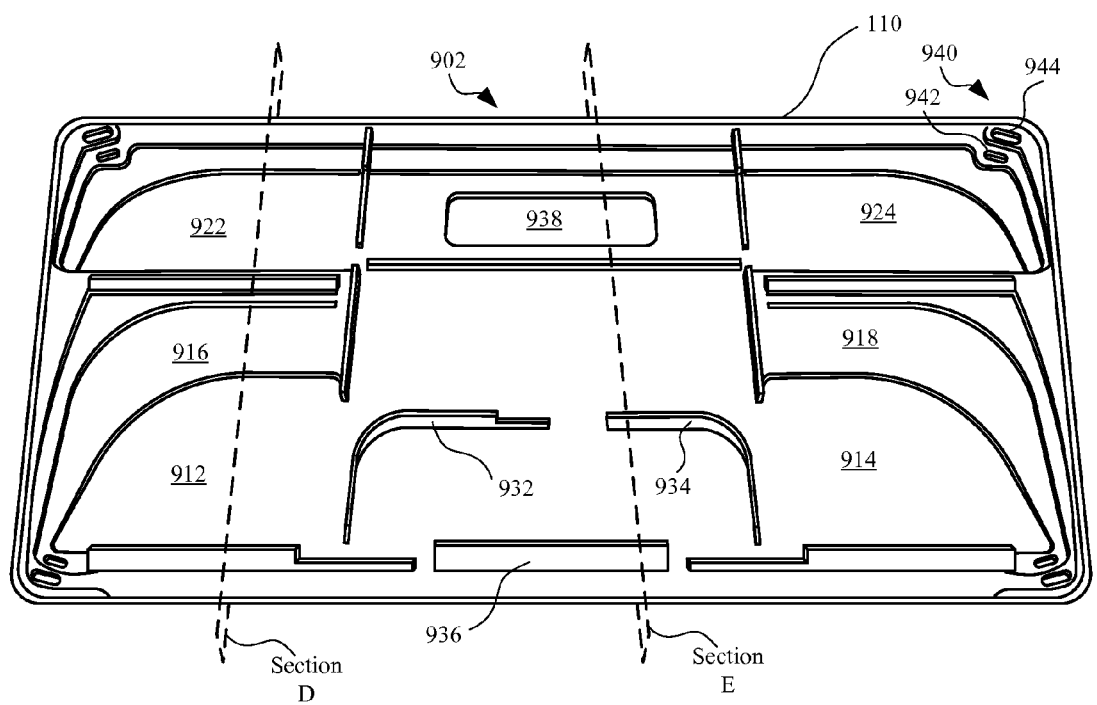
FIG. 36 illustrates an isomeric view of an interior region of a bottom case of a portable computing device, in accordance with the described embodiments.

FIG. 36 illustrates an isometric view of an interior region 902 of a bottom case 110 of a portable computing device, in accordance with the described embodiments. The bottom case 110 is designed to engage a top case 114 and provide a base for a portable computing device 100 (shown in FIG. 1). As shown, the bottom case 110 has undergone multiple material removal processes to define several terraced regions through the bottom case 110. For example, the bottom case 110 includes a first terraced region 912 and a second terraced region 914, both of which are positioned at a substantially similar vertical elevation within the bottom case 110. Also, the bottom case may further include a third terraced region 916 and a fourth terraced region 918, both of which are positioned at a substantially similar vertical elevation within the bottom case 110. However, the third terraced region 916 and the fourth terraced region 918 are positioned at an elevation higher than that of the first terraced region 912 and the second terraced region 914. Also, the bottom case may further include a fifth terraced region 922 and a sixth terraced region 924, both of which are positioned at a substantially similar vertical elevation within the bottom case 110. The fifth terraced region 922 and the sixth terraced region 924 are positioned at an elevation higher than that of the third terraced region 916 and the fourth terraced region 918. The terraced regions previously described provide additional space for a portable computing device in order to compensate for a smaller form factor of the portable computing device. For example, the terraced regions can receive one or more battery packs. This allows for additional volume for the one or more battery packs as opposed to a traditional battery defined by a single, unitary structure.

The bottom case 110 may further include additional regions defined by the material removal processes. For example, as shown, the bottom case 110 includes a first spline region 932, a second spline region 934, and a third spline region 936. The first spline region 932, the second spline region 934, and the third spline region 936 may provide support to the bottom case 110 by, for example, engaging the top case 114 (shown in FIG. 1). Further, the first spline region 932, the second spline region 934, and the third spline region 936 further define an area in which an internal component (for example, an integrated circuit) can be received by the bottom case 110. Also, the bottom case 110 can include an additional material removal process to define a cavity 938 designed to receive an additional internal component.

In some embodiments, a single material removal process with a particular cutting tool is used. In the embodiment shown in FIG. 36, a first cutting process is performed to the bottom case 110. The first cutting process uses a first cutting tool. Also, the first cutting process can be referred to a "rough" cut as a substantial portion of the bottom case 110 is removed. The pattern taken by the first cutting process can be performed in a raster scan operation, or alternatively, in a spiral pattern. Then, a second subsequent cutting process can be performed. The second cutting process can include a second cutting tool with a larger radius than that of the first cutting tool. In this manner, the edges defined by the second cutting tool are generally smoother and reduce the probability of sharp edges that can cut internal components, such as the battery packs. Also, a two-part cutting process can reduce manufacturing times of the bottom case 110 as opposed to a traditional, single cutting operation.

Also, the corner regions of the bottom case 110 include a pair of openings designed to receive a foot feature that engages a surface on which the bottom case 110 can be positioned. For example, the first corner region 940 includes a first cavity 942 and a second cavity 944, both of which may include multiple openings (not shown). These will be described in detail below.

Figure 37:
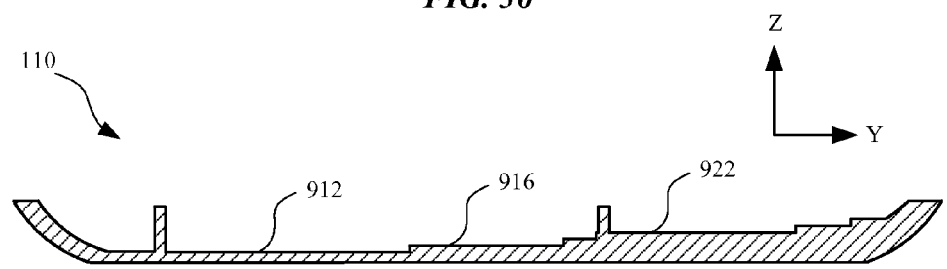
FIG. 37 illustrates a cross sectional view of the bottom case shown in FIG. 36 taken along Section D in FIG. 36.
Figure 38:
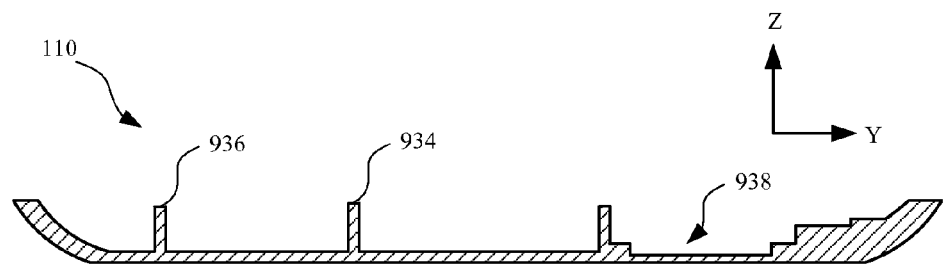
FIG. 38 illustrates a cross sectional view of the bottom case shown in FIG. 36 taken along Section E in FIG. 36.

FIGS. 37 and 38 are cross sectional views of FIG. 36 to illustrate the various elevations of the bottom case 110 defined by the two-part material removal process. FIG. 37 illustrates a cross sectional view of the bottom case shown in FIG. 36, taken along Section D. As shown, in the z-dimension, the first terraced region 912 is below the third terraced region 916, which in turn is below the fifth terraced region 922.

FIG. 38 illustrates a cross sectional view of the bottom case shown in FIG. 36, taken along Section E. The second spline region 934 and the third spline region 936 are higher in elevation in a z-dimension than a region between the second spline region 934 and the third spline region 936. Also, the cavity 938 is lower in the z-dimension as compared to other cross sectional regions of the bottom case 110 shown in FIG. 38.

Figure 39:
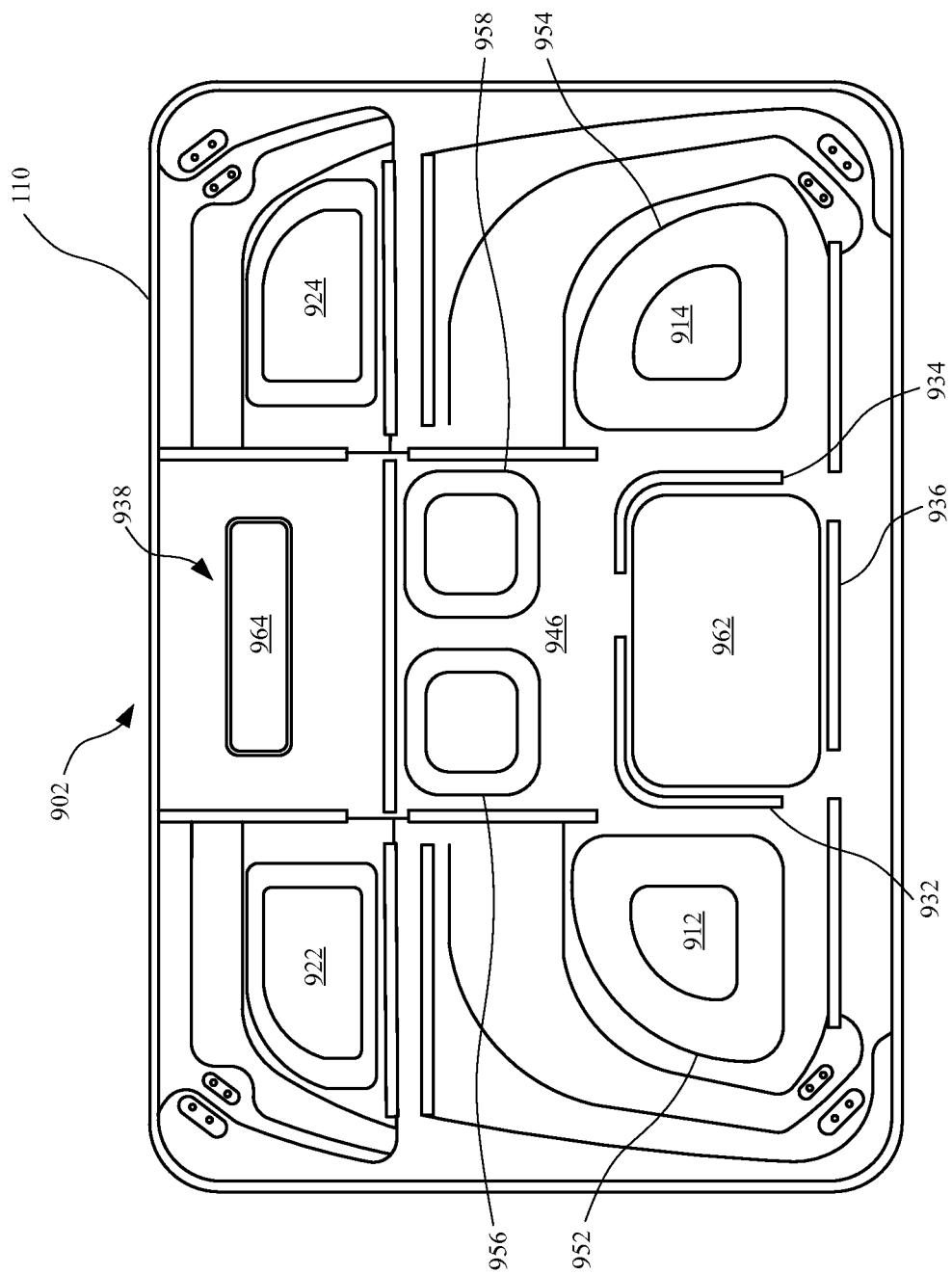
FIG. 39 illustrates a plan view of the interior region of the bottom case having several adhesive structures secured with the terrace regions of the bottom case.

FIG. 39 illustrates a plan view of the interior region 902 of the bottom case 110 having several adhesive structures secured with the terrace regions of the bottom case 110. For instance, the first terraced region 912 and the second terraced region 914 include a first adhesive ring 952 and a second adhesive ring 954, respectively. Also, a central region 946 of the bottom case 110 includes a third adhesive ring 956 and a fourth adhesive ring 958. The adhesive rings may be used to secure internal components (for example, battery packs) with the bottom case 110. In some embodiments, the adhesive rings are formed from a PSA. Also, the adhesive rings have a size and a shape to provide sufficient adhesive forces to the internal components. Moreover, the adhesive rings are not excessively large to provide unnecessary adhesion forces. In this manner, a portable computing device (such as the portable computing device 100 in FIG.

1) can be made with a reduced weight based upon considerations of the size and shape of the adhesive rings.

The bottom case 110 may include additional adhesive structures. For example, a first adhesive structure 962 is located between the first spline region 932, the second spline region 934, and the third spline region 936. In some embodiments, the first adhesive structure 962 secures an internal component, such as an integrated circuit or a speaker module, with the bottom case 110. Also, the cavity 938 may include a second adhesive structure 964 designed to secure another internal component with the bottom case 110. The first adhesive structure 962 and the second adhesive structure 964 may include a PSA. By securing internal components to the bottom case 110, the overall structural rigidity of the bottom case 110 is increased and therefore compensates for a bottom case 110 that is relatively thin due to the material removal process.

Figure 40:
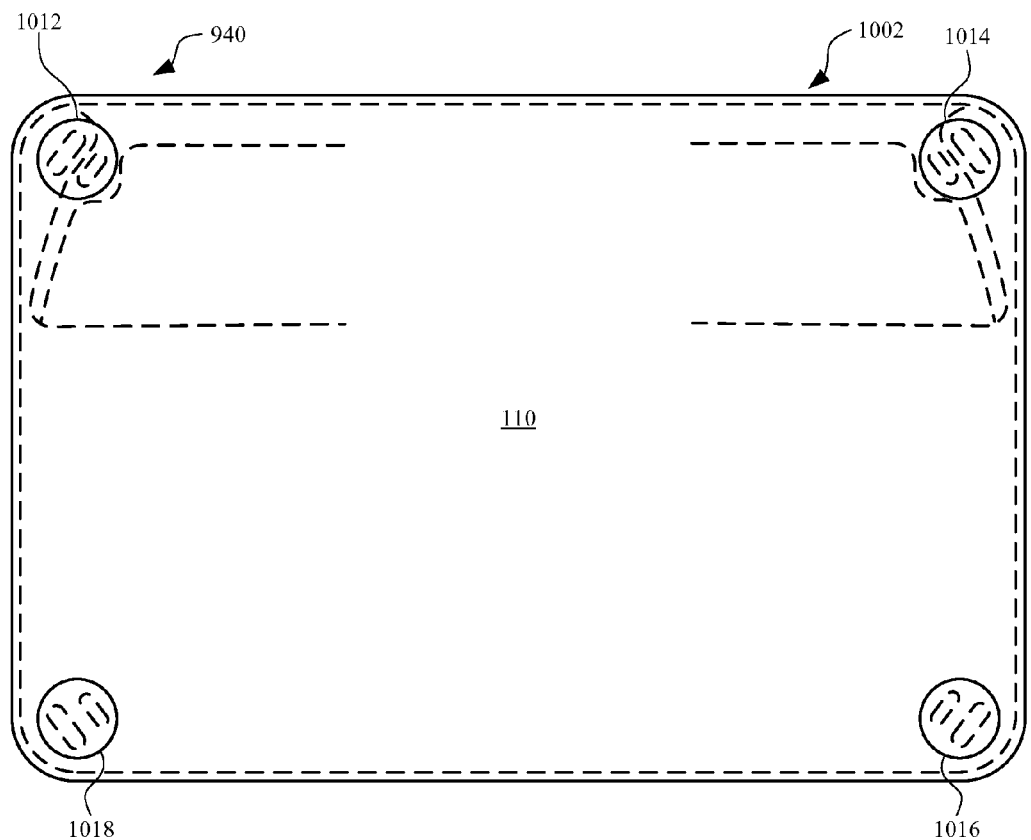
FIG. 40 illustrates a plan view showing an exterior region of the bottom case having several foot features.

FIG. 40 illustrates a bottom view showing an exterior region 1002 of the bottom case 110 having several foot features. For example, the first corner region 940 of the bottom case 110 includes a first foot feature 1012 secured with the bottom case 110. The bottom case 110 further includes a second foot feature 1014, a third foot feature 1016, and a fourth foot feature 1018. In some embodiments, the first foot feature 1012, the second foot feature 1014, the third foot feature 1016, and the fourth foot feature 1018 are made from a rubber material. Due to the spacing limitations created by the terraced regions previously described, a particular process described below is developed to secure the foot features with the bottom case 110.

Figure 41:
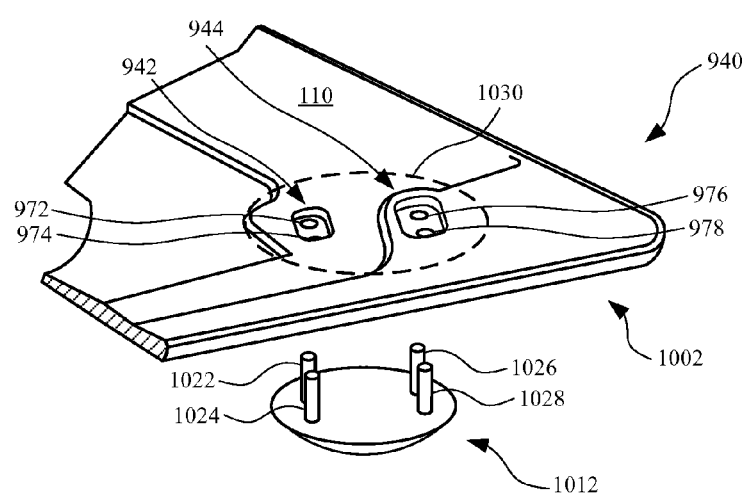
FIG. 41 illustrates an isometric view of a corner region of the bottom prior to receiving the first foot feature.

FIGS. 41-44 illustrate a process for installing the first foot feature 1012 with the bottom case 110, and serves as an exemplary process for the remaining foot features. FIG. 41 illustrates an isometric view of the first corner region 940 of the bottom case 110 prior to receiving the first foot feature 1012. As shown, the first cavity 942 of the bottom case 110 includes a first opening 972 and a second opening 974 designed to receive a first protrusion 1022 and a second protrusion 1024, respectively, of the first foot feature 1012. Further, the second cavity 944 of the bottom case 110 includes a third opening 976 and a fourth opening 978 designed to receive a third protrusion 1026 and a fourth protrusion 1028, respectively. Using several protrusions offers a more robust first foot feature 1012 that can withstand, for example, a first protrusion 1022 breaking off of the first foot feature 1012. In other words, the remaining protrusions are capable of securing the first foot feature 1012 with the bottom case 110 in the event the first protrusion 1022 is detached from the first foot feature 1012.

Also, the exterior region 1002 can include a laser ablation region 1030 that defines a further material removal process in which the first foot feature 1012 will be positioned. Also, although not shown, an adhesive, such as PSA, can be positioned within the laser ablation region 1030, and is used to further secure the first foot feature 1012 with the bottom case 110.

Figure 42:
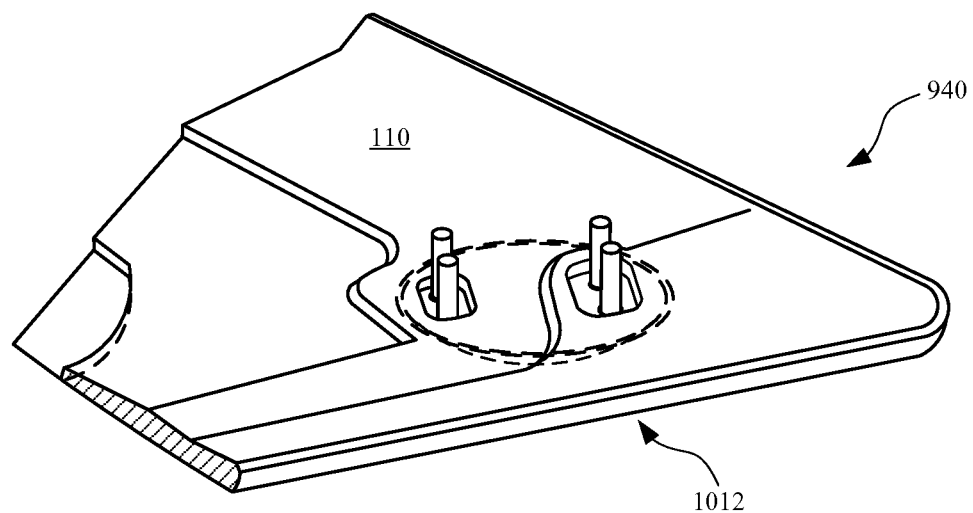
FIG. 42 illustrates an isometric view of the corner region of the bottom case shown in FIG. 40, with the protrusions of the first foot feature extending through the openings of the bottom case.
Figure 43:
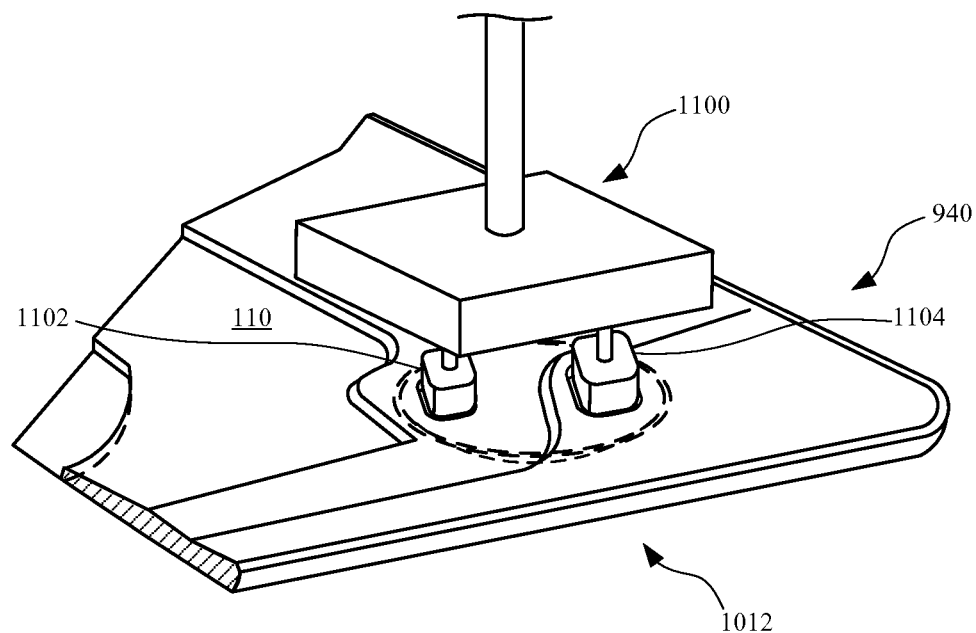
FIG. 43 illustrates an isometric view of the corner region of the bottom case shown in FIG. 41, with a heat deforming member engaging the protrusions.

FIG. 42 illustrates an isometric view of the first corner region 940 of the bottom case 110 shown in FIG. 40, with the protrusions of the first foot feature 1012 extending through the openings of the bottom case 110. FIG. 43 illustrates an isometric view of the first corner region 940 of the bottom case shown in FIG. 42, with a heat deforming feature 1100 engaging the protrusions of the first foot feature 1012. The heat deforming feature 1100 can define a heat staking process designed to melt the protrusions. The heat deforming feature 1100 can include a first heating member 1102 designed to heat and melt the first protrusion 1022 and the second protrusion 1024 (shown in FIG. 41). Also, the heat deforming feature 1100 can include a second heating member 1104 designed to heat and melt the third protrusion 1026 and the fourth protrusion 1028 (shown in FIG. 41). Once the melting process is finished, the heat deforming feature 1100 can be removed.

Figure 44:
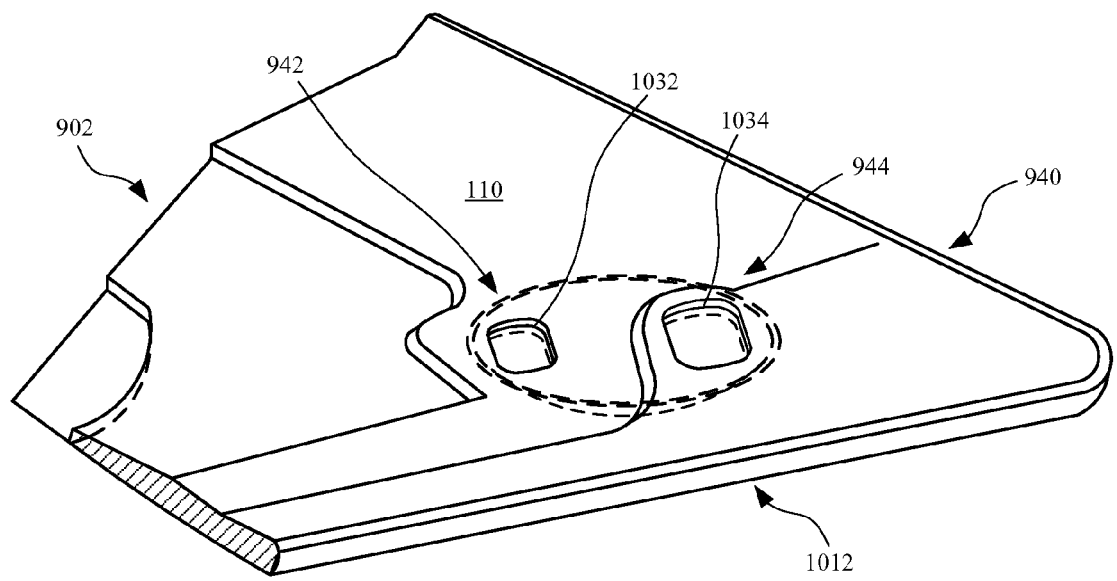
FIG. 44 illustrates an isometric view of the corner region of the bottom case shown in FIG. 42, with the protrusions deformed subsequent to a heat staking process.

FIG. 44 illustrates an isometric view of the first corner region 940 of the bottom case 110 shown in FIG. 43, with the protrusions deformed subsequent to a melting process. The first protrusion 1022 and the second protrusion 1024 (shown in FIG. 41) are melted and cured to define a first mechanical interlock 1032 in the first cavity 942 between the first foot feature 1012 and the bottom case 110. Also, the third protrusion 1026 and the fourth protrusion 1028 (shown in FIG. 41) are melted and cured to define a second mechanical interlock 1034 in the second cavity 944 between the first foot feature 1012 and the bottom case 110. In this manner, the first foot feature 1012 can be secured with the bottom case 110 via the first mechanical interlock 1032, the second mechanical interlock 1034, and in some cases, an adhesive layer (not shown). Also, the first cavity 942 and the second cavity 944 are designed such that the first mechanical interlock 1032 and the second mechanical interlock 1034 are sub-flush, or below, the interior region 902 of the bottom case, as shown in FIG. 44. In this manner, the first mechanical interlock 1032 and the second mechanical interlock 1034 do not disturb other internal components, such as a battery pack, proximate to the first cavity 942 and/or the second cavity 944.

Figure 45:
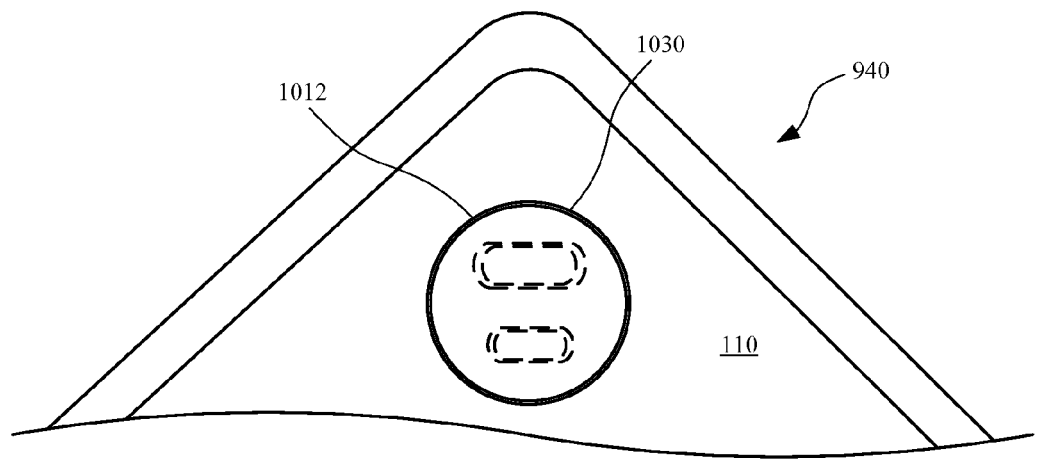
FIG. 45 illustrates a plan view of the first foot feature assembled with the bottom case.

FIG. 45 illustrates a bottom view of the first foot feature 1012 assembled with the bottom case 110. As shown, the first foot feature is within the laser ablation region 1030. This process can be performed on the remaining foot features.

Figure 46:
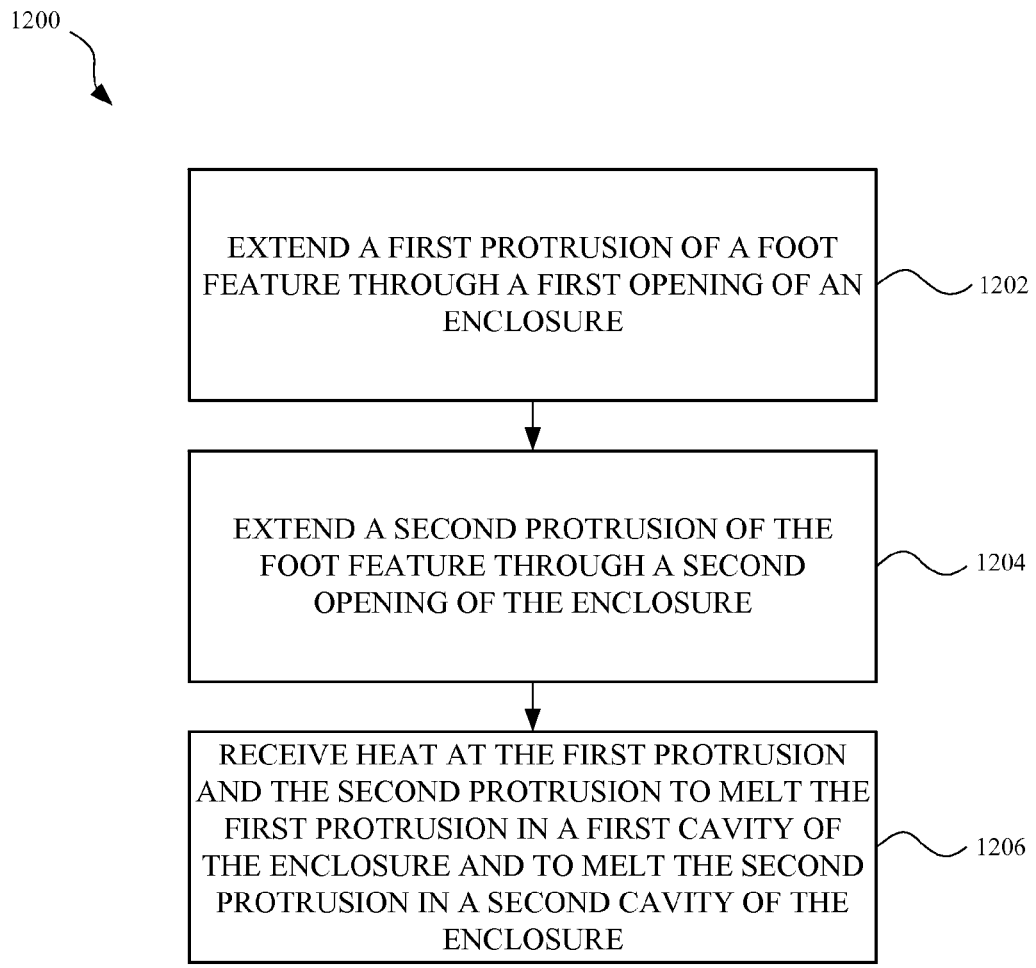
FIG. 46 illustrates a flowchart showing a method for forming a portable computing device.

FIG. 46 illustrates a flowchart 1200 showing a method for assembling a portable computing device is described. In step 1202, a first protrusion of a foot feature extends through a first opening of an enclosure. The first protrusion and the foot feature may be formed from a polymeric material, such as rubber and/or plastic, with the first protrusion designed to melt and deform in response to heat. In step 1204, a second protrusion of the foot feature extends through a second opening of the enclosure. The second protrusion may include any features previously described for the first protrusion. Also, the foot feature may include additional protrusions, such as a third protrusion and a fourth protrusion. Further, the portable computing device may include several additional foot features in addition to the foot feature described.

In step 1206, heat is received at the first protrusion and the second protrusion to melt the first protrusion in a first cavity of the enclosure and to melt the second protrusion in a second cavity of the enclosure. Also, the second cavity may be different from the first cavity. The first protrusion and the second protrusion melt within the first cavity and the second cavity, respectively, in a manner such that the resultant melted (and cured) material remains sub-flush, or below, the respective cavities.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system.

Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A retention feature for securing a flexible circuit assembly in an enclosure of a portable computing device, wherein the enclosure has upper and lower interior surfaces and first and second undercut regions in the upper interior surface, the retention feature comprising:
   a first extension that protrudes into the first undercut region of the enclosure;
   a second extension that protrudes into the second undercut region of the enclosure;
   a central portion between the first and second extensions that secures the flexible circuit assembly to the upper and lower surfaces of the enclosure; and
   wherein the first extension and the second extension combine with the central portion to provide a counteracting force exerted on the flexible circuit assembly when the enclosure pivots with respect to a base portion of the portable computing device.

2. The retention feature of claim 1, further comprising:
   a first mounting structure that receives a first fastener to secure the first extension with the enclosure; and
   a second mounting structure that receives a second fastener to secure the second extension with the enclosure.

3. The retention feature of claim 2, further comprising a compressible member that applies a force to the flexible circuit assembly such that the flexible circuit assembly engages the enclosure.

4. The retention feature of claim 3, further comprising a polycarbonate material including glass fiber.

5. The retention feature of claim 3, wherein the compressible member comprises a foam material.

6. The retention feature of claim 1, wherein the first extension and the second extension are elevated with respect to the central portion to define a bowed configuration, wherein the bowed configuration provides a preload force.

7. A portable computing device, comprising:
   a display housing that comprises a display module and a magnet that generates a first magnetic field;
   a base portion coupled with the display housing;
   a sensor disposed in the base portion, the sensor configured to detect the first magnetic field of the magnet and generate an electrical signal in response to detecting the first magnetic field; and
   a magnetic shield feature that covers the sensor, the magnetic shield feature configured to redirect a second magnetic field away from the sensor to prevent the sensor from generating the electrical signal, the second magnetic field generated by an external magnet.

8. The portable computing device of claim 7, further comprising a second magnetic shield feature aligned with the magnetic shield feature to further redirect the second magnetic field away from the sensor.

9. The portable computing device of claim 8, wherein the base portion comprises a keyboard assembly that includes a keyboard shield having an electrically conductive layer, wherein the magnetic shield feature is electrically coupled with the electrically conductive layer.

10. The portable computing device of claim 9, wherein the base portion further comprises a bottom case, and wherein the second magnetic shield feature is electrically coupled with the bottom case.

11. The portable computing device of claim 10, wherein the magnetic shield feature and the second magnetic shield feature are separated by an air gap.

12. The portable computing device of claim 10, wherein the bottom case comprises a terraced region that receives an internal component.

13. The portable computing device of claim 12, wherein the bottom case further comprises a foot feature that includes a first mechanical interlock in a first cavity of the bottom case and a second mechanical interlock in a second cavity of the bottom case.

14. The portable computing device of claim 7, wherein the display housing comprises a retention feature that includes a first extension that and a second extension that engaged the display housing, wherein the retention feature engages a flexible circuit assembly extending from the display housing to the base portion to limit movement of the flexible circuit assembly.

15. An electronic device comprising:
   a housing member with first and second retention structures, wherein the first retention structure has a first angled cavity and the second retention structure has a second angled cavity;
   an electrical component mounted in the housing member, the electrical component having first and second openings respectively aligned with the first and second angled cavities;
   a first fastener that passes through the first opening and the first angled cavity; and
   a second fastener that passes through the second opening and the second angled cavity.

16. The electronic device of claim 15 wherein the first and second angled cavities are angled toward each other.

17. The electronic device of claim 15 wherein the electrical component comprises an input device.

18. The electronic device of claim 17 wherein the input device comprises a keyboard.

19. The electronic device of claim 18 further comprising an adhesive that secures the keyboard to the housing member.

20. The electronic device of claim 18 wherein the keyboard comprises a plurality of keys that align with a plurality of holes in the housing member.

* * * * *